US012602498B1

(12) United States Patent

Grobelny et al.

(10) Patent No.: US 12,602,498 B1

(45) Date of Patent: Apr. 14, 2026

(54) SYSTEM AND METHOD FOR SECURING AUDIO AND VIDEO DATA FOR ARTIFICIAL INTELLIGENCE OPERATIONS ON AN INFORMATION HANDLING SYSTEM

(71) Applicant: Dell Products LP, Round Rock, TX (US)

(72) Inventors: Nicholas D. Grobelny, Evergreen, CO (US); Jacob Mink, Cedar Park, TX (US); Srikanth Kondapi, Austin, TX (US); Mohit Arora, Frisco, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 52 days.

(21) Appl. No.: 18/901,407

(22) Filed: Sep. 30, 2024

(51) Int. Cl.
G06F 21/62 (2013.01)
G06F 12/14 (2006.01)
H04L 9/08 (2006.01)

(52) U.S. Cl.
CPC ...... *G06F 21/6209* (2013.01); *G06F 12/1408* (2013.01); *G06F 21/6281* (2013.01); *H04L 9/0819* (2013.01)

(58) Field of Classification Search
CPC .. G06F 12/14; G06F 12/1408; G06F 12/1466; G06F 21/62; G06F 21/6209;
(Continued)

(56) References Cited

U.S. PATENT DOCUMENTS 8,380,714 B2    2/2013  Inagaki
8,542,805 B2 *  9/2013  Agranovsky ..... H04M 3/42221
                                                    379/93.08
(Continued)

FOREIGN PATENT DOCUMENTS

WO      2020/192587 A1    10/2020
WO      2021/050382 A1    3/2021
(Continued)

OTHER PUBLICATIONS

Costa et al., Evolving Cybersecurity Challenges in the Age of AI-Powered Chatbots: A Comprehensive Review (Year: 2024).*

(Continued)

*Primary Examiner* — Oscar A Louie
(74) *Attorney, Agent, or Firm* — Prol Intellectual Property Law, PLLC; H. Kenneth Prol

(57)                ABSTRACT

An information handling system comprising a hardware processor to execute computer-readable program code instructions of a first unprivileged artificial intelligence (AI) productivity-tool software process for operations of an AI productivity tool software module to detect receipt of audio/video user query input data and generate a first encryption key for transmission to an audio/video encryption driver and a second unprivileged AI productivity-tool software process. The hardware processor to execute computer-readable program code of the audio/video encryption filter driver to encrypt the audio/video user query input data with the first encryption key for storage in an allocated encrypted storage buffer portion of the kernel system memory and the for second unprivileged AI productivity-tool software process to access the audio/video user query input data from the allocated encrypted storage buffer portion of the kernel system memory with the first encryption key to determine a capability intent action responsive to a user query input.

20 Claims, 5 Drawing Sheets

(58) Field of Classification Search

CPC ..... G06F 21/6281; G06F 21/629; H04L 9/08;
H04L 9/0819

See application file for complete search history.

(56) References Cited

U.S. PATENT DOCUMENTS

| 8,548,951 | B2 | 10/2013 | Solmer | |
|---|---|---|---|---|
| 9,201,957 | B2 | 12/2015 | Turdakov | |
| 9,218,412 | B2 | 12/2015 | Wang | |
| 9,626,358 | B2 | 4/2017 | Danielyan | |
| 9,633,085 | B2 | 4/2017 | Kamotsky | |
| 9,648,683 | B2 | 5/2017 | Kangyo | |
| 10,146,593 | B2 | 12/2018 | Gong | |
| 11,620,262 | B2 | 4/2023 | Lee | |
| 11,948,073 | B2 | 4/2024 | Zhang | |
| 2002/0150248 | A1* | 10/2002 | Kovacevic | H04N 21/43853 |
| | | | | 348/E7.056 |
| 2018/0365065 | A1 | 12/2018 | Guttman | |
| 2019/0188386 | A1* | 6/2019 | Pogorelik | G06F 15/7807 |
| 2020/0387550 | A1 | 12/2020 | Cappetta | |
| 2020/0394360 | A1 | 12/2020 | Dunn | |
| 2021/0216576 | A1 | 7/2021 | Staub | |
| 2021/0256207 | A1 | 8/2021 | Dunn | |
| 2021/0334194 | A1 | 10/2021 | Xiao | |
| 2021/0366506 | A1 | 11/2021 | Han | |
| 2021/0374353 | A1 | 12/2021 | Zhang | |
| 2022/0035684 | A1 | 2/2022 | Gupte | |
| 2022/0035732 | A1 | 2/2022 | Xiao | |
| 2022/0092439 | A1 | 3/2022 | Liu | |
| 2022/0318502 | A1 | 10/2022 | Howell | |
| 2022/0414237 | A1* | 12/2022 | Lally | G06F 21/604 |
| 2023/0105806 | A1 | 4/2023 | Dunn | |
| 2023/0222359 | A1 | 7/2023 | Panikkar | |
| 2023/0237263 | A1 | 7/2023 | Howell | |
| 2023/0251962 | A1 | 8/2023 | Xiao | |
| 2023/0267374 | A1 | 8/2023 | Polleri | |
| 2023/0336340 | A1 | 10/2023 | Polleri | |
| 2023/0409277 | A1 | 12/2023 | Sharifi | |
| 2024/0007414 | A1 | 1/2024 | Jain | |
| 2024/0037346 | A1 | 2/2024 | Chorakhalikar | |
| 2024/0054318 | A1 | 2/2024 | Feltin | |
| 2024/0061719 | A1 | 2/2024 | Reddy | |
| 2024/0069770 | A1 | 2/2024 | Prabhakar | |
| 2024/0069959 | A1 | 2/2024 | Prabhakar | |
| 2024/0070113 | A1 | 2/2024 | Prabhakar | |
| 2024/0161003 | A1 | 5/2024 | Alexander | |
| 2025/0259043 | A1* | 8/2025 | Crabtree | G06N 3/042 |
| 2025/0291940 | A1* | 9/2025 | Gunasekaran | G06F 12/1408 |

FOREIGN PATENT DOCUMENTS

| WO | WO-2021162792 A1 * | 8/2021 | ......... G06F 12/1475 |
|---|---|---|---|
| WO | 2023/249666 A1 | 12/2023 | |

OTHER PUBLICATIONS

Feng et al., Anonymous Privacy-Preserving Consensus via Mixed Encryption Communication (Year: 2022).*

He et al., Security of AI Agents (Year: 2024).*

Lee et al., A Pre-Kernel Agent Platform for Security Assurance (Year: 2011).*

Qammar et al., Chatbots to ChatGPT in a Cybersecurity Space: Evolution, Vulnerabilities, Attacks, Challenges, and Future Recommendations (Year: 2021).*

Williams, Fortifying Chatbot Technologies: Navigating Security Challenges and Solutions in The AI Era (Year: 2024).*

* cited by examiner

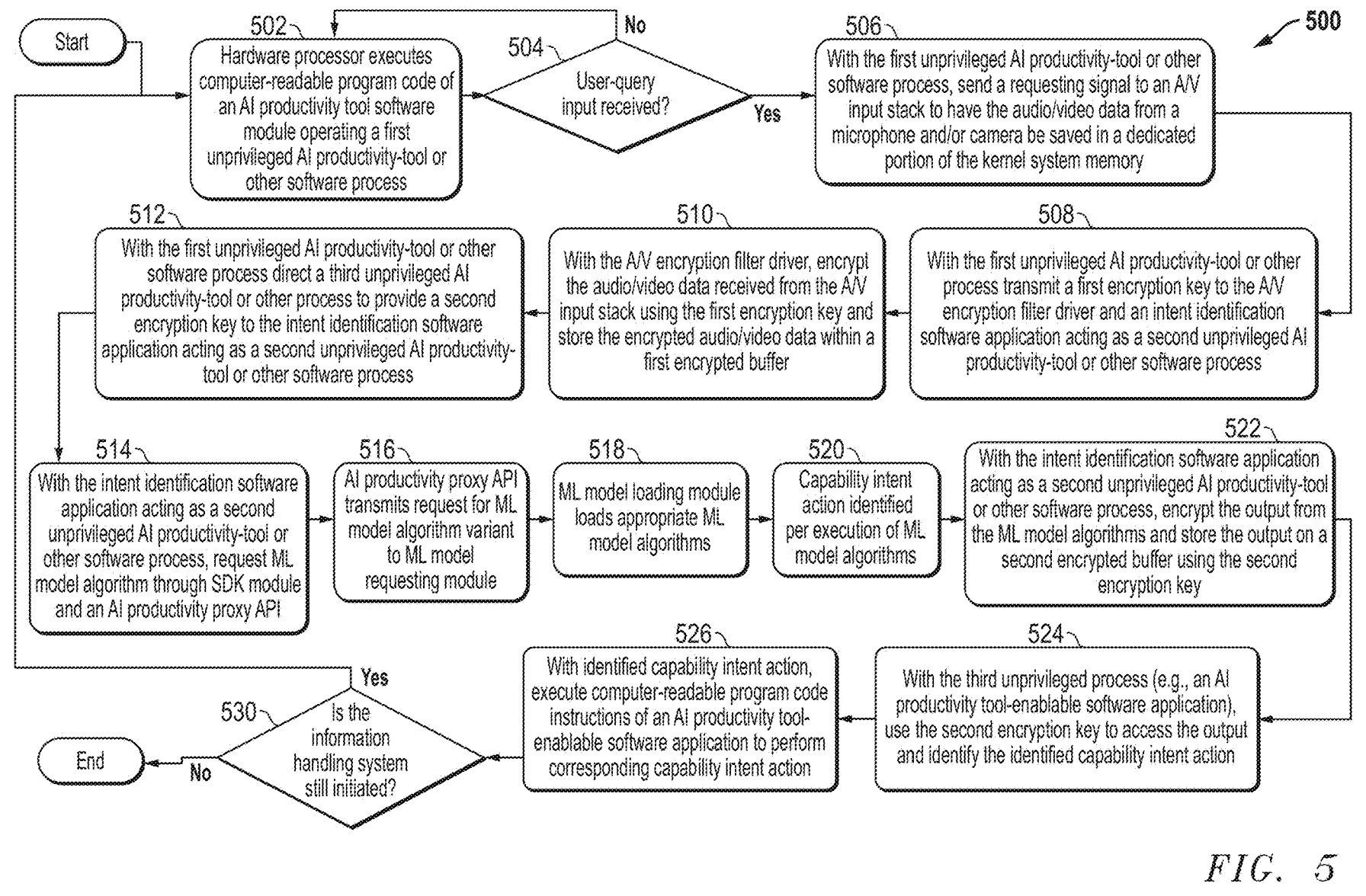

500

Start

502 — Hardware processor executes computer-readable program code of an AI productivity tool software module operating a first unprivileged AI productivity-tool or other software process 504 — User-query input received?

No

Yes

506 — With the first unprivileged AI productivity-tool or other software process, send a requesting signal to an A/V input stack to have the audio/video data from a microphone and/or camera be saved in a dedicated portion of the kernel system memory 508 — With the first unprivileged AI productivity-tool or other process transmit a first encryption key to the A/V encryption filter driver and an intent identification software application acting as a second unprivileged AI productivity-tool or other software process 510 — With the A/V encryption filter driver, encrypt the audio/video data received from the A/V input stack using the first encryption key and store the encrypted audio/video data within a first encrypted buffer 512 — With the first unprivileged AI productivity-tool or other software process direct a third unprivileged AI productivity-tool or other process to provide a second encryption key to the intent identification software application acting as a second unprivileged AI productivity-tool or other software process 514 — With the intent identification software application acting as a second unprivileged AI productivity-tool or other software process, request ML model algorithm through SDK module and an AI productivity proxy API 516 — AI productivity proxy API transmits request for ML model algorithm variant to ML model requesting module 518 — ML model loading module loads appropriate ML model algorithms 520 — Capability intent action identified per execution of ML model algorithms 522 — With the intent identification software application acting as a second unprivileged AI productivity-tool or other software process, encrypt the output from the ML model algorithms and store the output on a second encrypted buffer using the second encryption key 524 — With the third unprivileged process (e.g., an AI productivity tool-enablable software application), use the second encryption key to access the output and identify the identified capability intent action 526 — With identified capability intent action, execute computer-readable program code instructions of an AI productivity tool-enablable software application to perform corresponding capability intent action 530 — Is the information handling system still initiated?

Yes

No

End

FIG. 5

SYSTEM AND METHOD FOR SECURING AUDIO AND VIDEO DATA FOR ARTIFICIAL INTELLIGENCE OPERATIONS ON AN INFORMATION HANDLING SYSTEM

FIELD OF THE DISCLOSURE

The present disclosure generally relates to securing audio and video data, such as part of a user query input, from access by unauthorized unprivileged software processes executed on the information handling system. The present disclosure more specifically securing audio and video data from access by a second unprivileged software process executed on the information handling system via use of an encrypted buffer internal system memory only accessible when a first unprivileged software process has provided an encryption key used to access the encrypted audio and video data stored on a kernel system memory for execution of computer-readable program code instructions for software processes of an artificial intelligence (AI) productivity tool software module.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute computer-readable program code instructions of one or more workspace productivity applications or other application such as for teleconferencing, word processing, sales systems, business software, gaming applications, or the like. Further, the information handling system may include an on the box (OTB) artificial intelligence (AI) productivity tool software module employing machine learning (ML) models stored locally at the information handling system, as installed by a manufacturer of the information handling system, for optimizing user productivity and information handling system performance.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5 is a flow diagram showing a method of securing audio-video user query input via execution of computer-readable program code instructions of an audio-video encryption filter driver and access to at least one encrypted buffer in kernel system memory according to an embodiment of the present disclosure.

The use of the same reference symbols in different drawings may indicate similar or identical items.

DETAILED DESCRIPTION OF THE DRAWINGS

Figure 1:
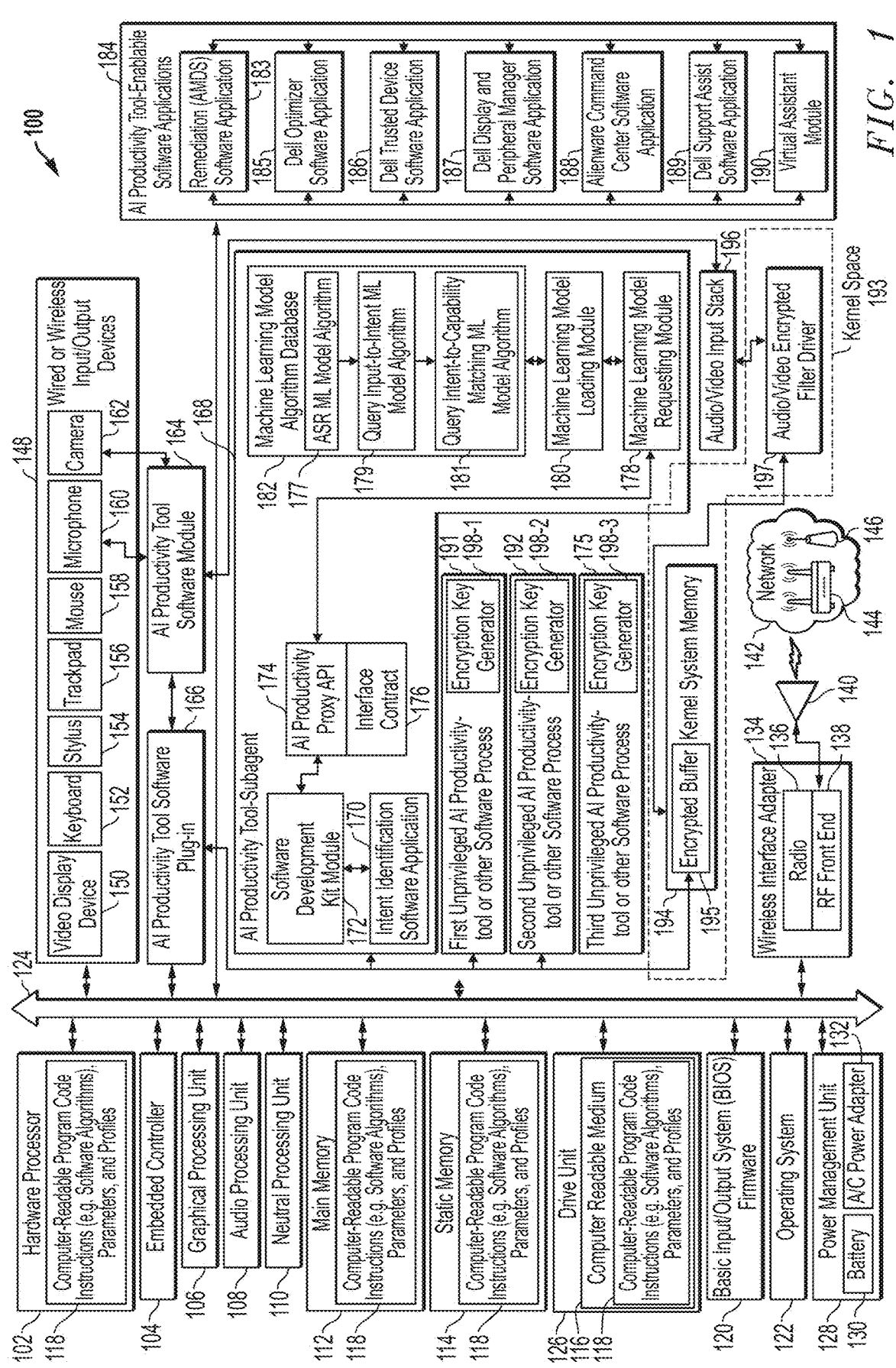
FIG. 1 is a block diagram illustrating an information handling system that includes computer-readable program code instructions of an audio/video encryption filter driver to control access to audio and video data in an encrypted buffer as directed by plural unprivileged software processes via use of one or more encryption keys among authorized, plural unprivileged software processes with an on the box (OTB) artificial intelligence (AI) productivity tool software module according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems, including computers, mobile computers, and smart phones are increasingly employing artificial intelligence (AI) productivity tool software modules to optimize user productivity and performance of the information handling systems. Examples of such artificial intelligence methodologies includes chatbots to simulate conversations between the information handling system and the user. In an example embodiment of the present disclosure, an AI productivity tool software module may be used to trigger changes in firmware or hardware (e.g., changing display or power settings), software, or processes of one or more AI productivity tool-enablable software applications (e.g., send an e-mail or text message, schedule a meeting) in response to a user-query input, for example. Various machine learning models may be used to support such functionality, including automatic speech recognition (ASR) models, text embedding models, and semantic or lexical similarity search models that may work in combination with one another for plural OTB AI productivity-tool operation processes to identify a capability intent action that may be taken by an AI productivity tool-enablable software applications as requested within a received user-query input according to embodiments herein. For example, an existing AI productivity tool software module and an operatively-coupled to an AI productivity tool subagent may be capable of determining a user's intent for correlation to a capability intent action the user is requesting to be performed within a user-query input, and matching that determined query intent with a capability intent known to be achievable, based on published or established capabilities by a particular of one or more AI productivity tool-enablable software applications executing at the information handling system. In some examples, once the AI productivity tool-enablable software application capable of performing the user-requested capability intent action within the user-query input is identified, the AI productivity tool subagent may identify an application programming interface (API) call that, when executed, may cause the AI productivity tool-enablable software application associated with the identified capability to perform that capability intent action responsive to a user-query input.

As described, however, as users interact with the chatbot features associated with the AI productivity tool software module, audio and video data captured by a microphone and/or camera is moved between processes without security systems such as encryption being used to prevent unauthorized processes gaining access to the audio and video or to embedded query data. This leaves the audio and video susceptible to possible access by third parties that could use the specific user information such as cadence, tonality, unique spectral content, grammatical choices, vocabulary, and appearance of the user for generating speaker embeddings for text-to-speech use and speaker-realistic content for deep fakes or other potentially harmful purposes. Protection of the audio and video data or to embedded query data would prevent such a third-party from gaining access to this data that could be used in nefarious ways.

The present specification describes an information handling system that includes a hardware processor, a memory device, and a power management unit to provide power to the hardware processor and memory device. In an embodiment, the hardware processor may execute computer-readable program code of a first unprivileged software process for an OTB AI productivity tool or other software process to request audio/video user query input be recorded from a peripheral device. The A/V user query may be initially stored in an A/V input stack memory as raw data. In an embodiment, the hardware processor may execute computer-readable program code of an encryption key generator associated with the unprivileged software process of the OTB AI productivity tool or other software process to generate an encryption key and pass the encryption key to an A/V encryption filter driver software or firmware. The raw A/V user query input data is also forwarded from the audio/video input stack to an A/V encryption filter driver software or firmware. In an embodiment, the hardware processor may execute computer-readable program code of the audio/video encryption filter driver to, via the audio/video stack, receive the encryption key and the raw recorded audio/video user query input. With this encryption key, the A/V encryption filter driver may then encrypt the recorded audio/video user query input data into an encrypted buffer storage in a kernel space memory device. Upon receiving a request from the first unprivileged software process of an OTB AI productivity tool or other first software process requesting that a portion of kernel system memory be allocated to store the recorded audio/video user query input encrypted with associated encryption key, such a portion of kernel memory is allocated for receiving encrypted user query input data for secured use by other, later software processes of the OTB AI productivity tool or other software process.

In an embodiment, the hardware processor may execute the computer-readable program code of the audio/video encryption filter driver to send a handle describing the allocated kernel system memory to the first unprivileged software process for the OTB AI productivity tool or other first software process for distribution, with the encryption key, to other unprivileged software process for the OTB AI productivity tool or other software processes via a secured communication for access to the recorded audio/video user query input. This system and method provides for encryption of the audio and video data obtained by a microphone and/or camera on behalf of a first unprivileged software process for the OTB AI productivity tool or other software process from access by other processes unless the first unprivileged software process for the OTB AI productivity tool or other first software process provides the encryption key to that other unprivileged software process. In other embodiments, that second unprivileged software process for the OTB AI productivity tool or other second software process is verified and shares a second encryption key with an inference process, such as an interference engine, to encrypt results of that interim process in a second encrypted buffer for access only by the second unprivileged software process for the OTB AI productivity tool or other software process.

In an embodiment, output from the invocation of one or more ML model algorithms may also be protected from access by other unauthorized processes. In an embodiment, the hardware processor may execute computer-readable program code instructions of an intent identification software application with an inference engine ML model algorithm executing as an interim second software process for the AI productivity tool to receive a copy of the first encryption key from the first unprivileged software process authorized for use with an OTB AI productivity tool or other software process to gain permission to access the recorded audio/video user query input as well as a second encryption key from a third unprivileged software process authorized for use with the OTB AI productivity tool or other authorized third software process. The hardware processor may execute computer-readable program code instructions of the intent identification software application to invoke one or more ML model algorithms, such as an inference engine, using the audio/video user query input as input. In an embodiment, the hardware processor may also execute computer-readable program code instructions of the intent identification software application to receive the second encryption key from the authorized third unprivileged software process of an OTB AI productivity tool or other authorized third software process to encrypt an output of the invocation of the ML model algorithms, such as the inference engine, and securely store the embedded query intent values on the kernel system memory by the intent identification software application at the second encrypted buffer set aside in kernel memory space.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 144, a base station transceiver 146, a wireless telephone, a control system, a camera, a scanner, a printer, a personal trusted device, a web appliance, or any other suitable machine capable of executing a set of instructions (sequential or otherwise) that specify capability intent actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 112, (volatile (e.g., random-access memory, etc.), or static memory 114, nonvolatile (read-only memory, flash memory etc.) or any combination thereof), one or more hardware processing resources, such as a hardware processor 102 (e.g., central processing unit (CPU)), an embedded controller (EC) 104, a graphics processing unit (GPU) 106, a neural processing unit (NPU) 110, an accelerated processing unit (APU) 108, other types of hardware processing devices, or any combination thereof. It is appreciated that the information handling system 100 may include any number of hardware processing devices described herein. Computer readable code instructions stored in main memory 112 (e.g., RAM) may be "hot" or quickly accessible by hardware processing resources using that main memory 112. Computer-readable program code instructions stored in static memory 114, main memory 112, or drive unit 126 may be "cold" and latency may be involved in invoking such computer-readable program code instructions to main memory 112 according to embodiments herein. Additional components of the information handling system 100 may include one or more storage devices such as static memory 114 or drive unit 126. In embodiments herein, a portion of the main memory 112 may include kernel system memory 194 that is reserved and accessible to hardware, firmware, and software executing within kernel space 193. As described herein, those OTB AI productivity tool or other software processes authorized and executing within user space on the information handling system 100 may be prevented from accessing data on the kernel system memory 194 unless an encryption key has been provided to that OTB AI productivity tool or other software process within the user space. The information handling system 100 may include or interface with one or more communications ports for communicating with external devices, as well as various input and output (I/O) devices 148, such as a mouse 158, a trackpad 156, a stylus 154, a keyboard 152, a video/graphics display device 150, a microphone 160, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 118 that may operate on servers or systems, remote data centers, or on-box in individual client information handling systems according to various embodiments herein. In some embodiments, it is understood any or all portions of instructions (e.g., software algorithms), parameters, and profiles 118 may operate on a plurality of information handling systems 100.

The information handling system 100 may include the hardware processor 102 such as a central processing unit (CPU) or other hardware processing resources. Any of the hardware processing resources may operate to execute code that is either firmware or software code. Moreover, the information handling system 100 may include memory such as main memory 112, static memory 114, and disk drive unit 126 (volatile (e.g., random-access memory, etc.), nonvolatile (read-only memory, flash memory etc.) or any combination thereof or other memory with computer readable medium 116 storing instructions (e.g., software algorithms), parameters, and profiles 118 executable by the hardware processor 102 (e.g., central processing unit), NPU 110, APU 108, EC 104, GPU 106, or any other hardware processing device. The information handling system 100 may also include one or more buses 124 operable to transmit communications between the various hardware components such as any combination of various I/O devices 148 as well as between hardware processors 102, an EC 104, the operating system (OS) 122, the basic input/output system (BIOS) 120, the wireless interface adapter 134, or a radio module, among other components described herein. In an embodiment, the hardware processor 102, EC 104, GPU 106, NPU 210, APU 208, and/or others may execute one or more bus drivers in order to transmit this data between the information handling system 100 and the input/output devices 148 described herein. In an embodiment, the information handling system 100 may be in wired or wireless communication with the I/O devices 148 such a keyboard 152, a mouse 158, video display device 150, stylus 154, trackpad 156, microphone 160, among other peripheral devices.

As described herein, the information handling system 100 further includes a video/graphics display device 150. The video/graphics display device 150 in an embodiment may function as a liquid crystal display (LCD), an organic light emitting diode (OLED), a flat panel display, or a solid-state display. It is appreciated that the video/graphics display device 150 may be wired or wireless and may be an external video/graphics display device 150 that allows a user to increase the desktop area by extending the desktop in an embodiment. Additionally, as described herein, the information handling system 100 may include or be operatively coupled to a cursor control device (e.g., a trackpad 156, or gesture or touch screen input), a stylus 154, and/or a keyboard 148, among others that allows the user to interface with the information handling system 100 via the video/graphics display device 150. Information handling system 100 may also be operatively coupled to a wired or wireless input/output device 148 or other hardware devices that may include a hardware processing device such as a hardware processor, microcontroller, or other hardware processing resource. Various drivers and hardware control device electronics may be operatively coupled to operate the I/O devices 148 according to the embodiments described herein. The present specification contemplates that the I/O devices 148 may be wired or wireless.

A network interface device of the information handling system 100 may be wired or wireless such as shown with wireless interface adapter 134 that can provide wireless connectivity among devices such as with Bluetooth® or to a network 142, e.g., a wide area network (WAN), a local area network (LAN), wireless local area network (WLAN), a wireless personal area network (WPAN), a wireless wide area network (WWAN), or other network. In embodiments described herein, the wireless interface device 134 with its radio 136, RF front end 138 and antenna 136 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems.

In other embodiments, a WAN, WWAN, LAN, and WLAN may each include an AP 140 or base station 142 used to operatively couple the information handling system 100 to a network 142 via a wireless interface adapter 134. In a specific embodiment, the network 142 may include macro-cellular connections via one or more base stations 142 or a wireless AP 140 (e.g., Wi-Fi), or such as through licensed or unlicensed WWAN small cell base stations 142. Connectivity may be via wired or wireless connection. For example, wireless network wireless APs 140 or base stations 142 may be operatively connected to the information handling system 100. Wireless interface adapter 134 may include one or more RF (RF) subsystems (e.g., radio 136) with transmitter/receiver circuitry, modem circuitry, one or more antenna RF (RF) front end circuits 138, one or more wireless controller circuits, amplifiers, antennas 136 and other circuitry of the radio 136 such as one or more antenna ports used for wireless communications via multiple radio access technologies (RATs). The radio 136 may communicate with one or more wireless technology protocols.

In an embodiment, the wireless interface adapter 134 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WWAN such as 3GPP or 3GPP2, Bluetooth® standards, proprietary RF protocol, or similar wireless standards may be used. Wireless interface adapter 134 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 134 can represent an add-in card, wireless network interface module that is integrated with a main board of the information handling system 100 or integrated with another wireless network interface capability, or any combination thereof.

In some embodiments, a hardware processing resource executes computer-readable program code instructions of software or firmware to implement one or more of some systems and methods described herein, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware devices with related control and data signals that may be communicated between and through the modules, or as portions of an application-specific integrated circuit. Accordingly, the present system encompasses a hardware processing resource executing computer-readable program code instructions of software or firmware as well as hardware implementations or any combination.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable program code instructions, parameters, and profiles 118 or receives and executes computer-readable program code instructions, parameters, and profiles 118 responsive to a propagated signal, so that a hardware device connected to a network 142 may communicate voice, video, or data over the network 142. Further, the computer-readable program code instructions, parameters, and profiles 118 may be transmitted or received over the network 142 via the network interface device or wireless interface adapter 134.

The information handling system 100 may include a set of computer-readable program code instructions, parameters, and profiles 118 that may be executed to cause the computer system to perform any one or more of the methods or computer-based functions disclosed herein. For example, computer-readable program code instructions, parameters, and profiles 118 may be executed by a hardware processor 102, GPU 106, EC 104 or any other hardware processing resource and may include software agents, or other aspects or components used to execute the methods and systems described herein. Various software modules comprising application computer-readable program code instructions, parameters, and profiles 118 may be coordinated by an OS 122, and/or via an application programming interface (API). An example OS 122 may include Windows®, Android®, and other OS types. Example APIs may include Win 32, Core Java API, or Android APIs.

In an embodiment, the information handling system 100 may include a disk drive unit 126. The disk drive unit 126 and may include machine-readable program code instructions, parameters, and profiles 118 in which one or more sets of machine-readable program code instructions, parameters, and profiles 118 such as firmware or software can be embedded to be executed by the hardware processor 102 (e.g., CPU) or other hardware processing devices such as a GPU 106, an EC 104, an NPU 110, an APU 108, or other hardware processing resource device to perform the processes described herein. Similarly, main memory 112 and static memory 114 may also contain a computer-readable medium for storage of one or more sets of machine-readable program code instructions, parameters, or profiles 118 described herein. The disk drive unit 126 or static memory 114 also contain space for data storage. Further, the machine-readable program code instructions, parameters, and profiles 118 may embody one or more of the methods as described herein. In a particular embodiment, the machine-readable program code instructions, parameters, and profiles 118 may reside completely, or at least partially, within the main memory 112, the static memory 114, and/or within the disk drive 126 during execution by the hardware processor 102, EC 104, or GPU 106, NPU 110, APU 108 of information handling system 100.

Main memory 112 or other memory of the embodiments described herein may contain computer-readable medium (not shown), such as RAM in an example embodiment. An example of main memory 112 includes random access memory (RAM) such as static RAM (SRAM), dynamic RAM (DRAM), non-volatile RAM (NV-RAM), or the like, read only memory (ROM), another type of memory, or a combination thereof. Static memory 114 may contain computer-readable medium (not shown), such as NOR or NAND flash memory in some example embodiments. The applications and associated APIs, for example, may be stored in static memory 114 or on the disk drive unit 126 that may include access to a machine-readable code instructions, parameters, and profiles 118 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 128 (a.k.a. a power supply unit (PSU)). The PMU 128 may include a hardware controller and executable machine-readable code instructions to manage the power provided to the components of the information handling system 100 such as the hardware processor 102 and other hardware components described herein. The PMU 128 may control power to one or more components including the one or more drive units 126, the hardware processor 102 (e.g., CPU), the EC 104, the GPU 106, APU 108, NPU 110, a video/graphic display device 150, or other wired I/O devices 148 such as the mouse 158, the stylus 154, the keyboard 152, the microphone 160, and the trackpad 156 and other components that may require power when a power button has been actuated by a user. In an embodiment, the PMU 128 may monitor power levels and be electrically coupled to the information handling system 100 to provide this power. The PMU 128 may be coupled to the bus 124 to provide or receive data or machine-readable code instructions. The PMU 128 may regulate power from a power source such as the battery 130 or AC power adapter 132. In an embodiment, the battery 130 may be charged via the AC power adapter 132 and provide power to the components of the information handling system 100, via wired connections as applicable, or when AC power from the AC power adapter 132 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 114 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described in embodiments herein, the information handling system 100 includes an on the box (OTB) artificial intelligence (AI) productivity tool software module 164, also referred to as an AI productivity tool software module 164 herein, and an AI productivity tool subagent 168 to receive user-query input and provide that user-query input to the AI productivity tool subagent 168. In an embodiment, the execution of the computer-readable program code instructions 118 of the AI productivity tool subagent 168 by the hardware processor 102 or any other hardware processing device selects among a plurality of ML model algorithms 177, 179, 181 maintained within a ML model algorithm database 182 for use with execution of OTB AI productivity tool software processes or other software processes for AI productivity tool-enablable software applications or a plurality of AI productivity tool-enablable software applications 184 (e.g., 183, 185, 186, 187, 188, 189, 190) according to embodiments of the present disclosure. As described herein, the computer-readable program code instructions 118 of the OTB AI productivity tool software module 164 and AI productivity tool subagent 168 may be executed by a hardware processor 102 on the information handling system 100 thereby allowing the methods described herein to be carried out on-the-box such that a wired or wireless network connection to a network is not necessary for operation of the method. In another embodiment, some modules, databases, and/or processing resources may be maintained on a remote server such that a wired or wireless network connection can be made with these remote servers and the method may be implemented as described herein.

The OTB AI productivity tool software module 164 may include any artificial intelligence-based productivity tool to assist in interfacing with and execution of one or more AI productivity tool-enablable software applications 184 or inputs and responses from a user of an information handling system 100. The OTB AI productivity tool software module 164 may be loaded on-the-box by a manufacturer in software and may include chatbot features, virtual assistant features, and other artificial intelligence features that allow a user to provide input to the information handling system 100 and, with generative artificial intelligence processing of a user input query, execute one or more capabilities that include hardware operations, functions, software services, or responses using one or more AI productivity tool-enablable software applications 184. Examples of some OTB AI productivity tool software modules 164 may include Cortana® by Microsoft®, Copilot® by Microsoft®, Siri® by Apple® Inc., Gemini® by Google AIR, ChatGPT® by OpenAI®, and Amazon Alexa® by Amazon®, among others. It is appreciated that the information handling system 100 may include any proprietary OTB AI productivity tool software module 164 installed by an information handling system 100 manufacturer and used to interface with the information handling system 100 and the operations thereon. In various embodiments, the hardware processor 102 or other alternative hardware processing resources of the information handling system 100 may execute computer-readable program code instructions of the OTB AI productivity tool software module 164 with its AI productivity tool plug-in 166 and monitor for user input for a user query at a microphone 160, keyboard 152, camera 162, or other input device for the AI productivity tool subagent 168 to engage in capability intent actions pursuant to the user query input.

The OTB AI productivity tool software module 164, executing on the hardware processor 102 or other hardware processing resource (e.g., EC 104, GPU 106, APU 108, or NPU 110), may interface with other hardware components and with the AI productivity tool-enablable software applications 184 as well as one or more ML module algorithms 177, 179, 181 via an AI productivity tool plug-in 166. The AI productivity tool plug-in 166 may be any software or firmware that allows the AI productivity tool subagent 168 to perform one or more AI productivity tool software processes or other software processes, such as from AI productivity tool-enablable software applications184 at the information handling system 100 based on user-query input (e.g., typed, spoken words, images, etc.) provided from the user. The AI productivity tool plug-in 166 may be used by the OTB AI productivity tool software module 164 and AI productivity tool subagent 168 to interface with any number of AI productivity tool-enablable software applications 184 executing or executable on the information handling system 100 according to embodiments herein.

Again, the information handling system 100 also includes the AI productivity tool subagent 168 associated with the OTB AI productivity tool software module 164. The AI productivity tool subagent 168 may be any software and/or firmware executable by the hardware processor 102 of the information handling system 100 to interface one or more of the plurality of the AI productivity tool-enablable software applications 184 (such as a remediation (AMDS) software application 183, Dell® Optimizer® software application 185, Dell® Trusted Device® software application 186, Dell® Display and Peripheral Manager® software application 187, Alienware® Command Center® (AWCC) software application 188, Dell® Support Assist® software application 189, and a virtual assistant module 190) to provide AI enabled capabilities within those AI productivity tool-enablable software applications 184 (e.g., 183, 185, 186, 187, 188, 189, 190) for AI productivity tool software processes or other software processes, such as from one or more AI productivity tool-enablable software applications 184, for responsive hardware, firmware, or software operations, functions, software services, or responses to user input queries. In an embodiment, the computer-readable program code instructions of the software applications (e.g., AI productivity tool-enablable software applications 184 and modules described herein (e.g., 183, 185, 186, 187, 188, 189, 190) may operate wholly "on-box" within the information handling system 100 or be sub-agents on-box for interfacing with remote software systems executing at remote server locations. In an embodiment, the AI productivity tool subagent 168 may be used to direct the execution of various modules in support of the OTB AI productivity tool-enablable software modules 164 and AI productivity tool software processes or other software processes described herein. Additionally, the AI productivity tool subagent 168 may be provided with access to the BIOS and OS of the information handling system 100 to conduct the capability intent actions pursuant to the user's query input provided via the OTB AI productivity tool software module 164 or with an interface of one of the AI productivity tool-enablable software applications 184.

In an embodiment, during operation, the hardware processor 102 or other hardware processing resource (e.g., EC 104, GPU 106, CPU, APU 108, or NPU 110) executes computer-readable program code instructions of the AI productivity tool subagent 168 that includes an intent identification software application 170. The intent identification software application 170 may engage with a machine learning model requesting module 178 to have one or more ML model algorithms 181, 182 183 loaded by a machine learning model loading module 180 and executed on the hardware processor in order to conduct one or more AI productivity tool or other software processes. For example, one or more AI productivity tool or other software processes include determining the query intent value from a user-query input to correlate a query intent value with a capability intent of a capability to be conducted responsive to the received user-query inputs, and to conduct certain responsive capability intent actions determined responsive to the received user-query input. The execution of these one or more AI productivity tool or other software processes may be authorized by being invoked by the OTB AI productivity tool module 164 during its operation. The execution of the computer-readable program code instructions of the intent identification software application 170 may call a software development kit (SDK) module 172. The SDK module 172 may include any computer-readable program code instructions that is executed by the hardware processor 102 or other hardware processing resource to request that a ML model algorithm 177, 179, 181 be invoked to support the one or more AI productivity tool or other software processes to identify, in an embodiment, a capability intent action based on received user-query inputs from a user and execute such responsive capability intent actions. In an example, the ML model algorithms 177, 179, 181 stored on a machine learning model algorithm database 182 may include an automatic speech recognition (ASR) ML model algorithm 177 to generate a text query if any audio is included in the multi-modal intent value. The audio ASR ML model algorithm 177 may recognize the speech in the audio and transfer it into text to generate text query. In another embodiment, the ASR ML model algorithm 177 may receive the user-query input as some combination of audio, text, or video/image inputs and generates a vectorized multimodal query intent value for the multimodal user-query input using an embedding algorithm of the query input-to-intent ML model algorithm 179.

In another example, the ML model algorithms 177, 179, 181 may include a query input-to-intent ML model algorithm 179 that receives the user-query input as text or converted audio to text, and with an embedding algorithm generates a vectorized query intent value for the user-query input for later correlation with a capability intent value. In yet another example embodiment, the ML model algorithms may also include a query intent-to-capability matching ML model algorithm 181 that receives the vectorized query intent value or vectorized multimodal query intent value as input, matches the vectorized query intent value or vectorized multimodal query intent value to a vectorized capability intent value associated with the AI productivity tool-enablable software application 184 via a similarity correlation algorithm, and identifies a capability that can serve as the capability intent action responsive to a user-query input.

It is appreciated that execution of computer-readable program code instructions of the selected ML model algorithms 177, 179, 181 to conduct any of the above AI productivity tool or other software processes must satisfy an interface contract 176 requested by the intent identification software application 170 for the execution of the ML model algorithm. With the satisfaction of the interface contract 176, the query intent value from the user-query inputs may be interpreted and an available capability associated with one of the plurality of AI productivity tool-enablable software applications 184 can be statistically correlated via semantic or lexical similarity matching to the query intent value of the user-query input from the user, and the capability may be executed as a responsive capability intent action as various AI productivity tool or other software processes in embodiments herein. The interface contract 176 described herein defines the requirements that selected ML model algorithms 177, 179, 181 are to have in order to be able receive a specific type of input from the intent identification software application 170 or any AI productivity tool-enablable software application 184 and to provide a specific type of output to the intent identification software application 170 and/or AI productivity tool-enablable software applications 184 for the various AI productivity tool or other software processes. In an embodiment, the interface contract 176 is generated by an AI productivity proxy API 174 invoked by the SDK module 172 in order to identify the specific ML model algorithm 177, 179, 181 that provides the appropriate inputs or outputs to the intent identification software application 170 or AI productivity tool-enablable software application 184.

In embodiments of the present disclosure, the above-described AI productivity tool or other software processes may operate to communicate with one another and may be identified for discussion purposes as a first unprivileged software process of an OTB AI productivity tool or other first software process 191 and a second unprivileged software process of an OTB AI productivity tool or other second software process 192. In the present specification and in the appended claims, the term "unprivileged" with reference to a process is meant to be understood as any process that is executed at an information handling system 100 within Ring 3 of a hierarchical protection domain that establishes rings or layers of privilege within the architecture of information handling system 100. For example, a kernel space 193 may execute computer-readable program code and provide memory space at Ring 0, or an innermost ring within the hierarchical protection domain, that is most protected from error faults of higher or outer rings as well as from malicious attacks. Accordingly, a Ring 3 executed process relies on the OS 122 to give it small portions of memory within the RAM, for example, that can be accessed by the Ring 3 executing process. However, this portion of memory is not necessarily protected from access by other Ring 3 executing processes (e.g., computer-readable program code and processes).

Thus, Ring 0 within the kernel space 193 requires a different level of access to kernel privileged memory space and computer-readable program code instructions and that access may include access to all physical memory including at Ring 3. By contrast, a Ring 3 computer-readable program code instructions and processes do not have access to all memory without permissions except to that portion of memory allocated for operation of the Ring 3 computer-readable program code instructions and processes. It is appreciated, therefore, that the audio/video input stack 196, the audio/video encrypted filter driver 197, the kernel system memory 194, and the encrypted buffer 195 may be within the kernel space 193 so that the audio/video data received at the microphone 160, camera 162, and other peripheral devices is held and stored within a portion of memory that cannot be easily accessed by other non-kernel space devices, firmware, and software such as the first unprivileged AI productivity-tool or software process 191, second unprivileged AI productivity-tool or software process 192, and third unprivileged AI productivity-tool or software process 175 among other computer-readable program code instructions and processes given Ring 3 or lower privileges. This provides an added level of protection on top of the encryption key authorizations described in embodiments herein. It is appreciated that more or fewer of the hardware devices, modules, software applications, and processes shown in FIG. 1 may be included within the kernel space 193 so as to protect the audio/video data streaming to the A/V encrypted filter driver in various embodiments herein.

Input data, output data, and communication between the first unprivileged software process of an OTB AI productivity tool or other first software process 191 and the second unprivileged software process of an OTB AI productivity tool or other second software process 192 or others may contain sensitive or personal information in embodiments herein. Thus, embodiments of the present disclosure include executing code instructions of an audio/video (A/V) filter driver 197 and encryption key generators 198-1, 198-2, and 198-3 to provide for secure encryption, storage, and communications of that data as between the first unprivileged software process of an OTB AI productivity tool or other first software process 191, the second unprivileged software process of an OTB AI productivity tool or other second software process 192 or additional authorized software processes including additional unprivileged software processes of the an OTB AI productivity tool.

As described in embodiments herein, the information handling system 100 may be directed by a first unprivileged software process for the OTB AI productivity tool or other first software process 191 to pass audio and/or video from a microphone 160 and/or a camera 162 securely to an A/V encrypted filter driver 197 executing via a hardware processor such that this audio and/or video data cannot be accessible to any unauthorized process being executed on the information handling system or externally. In an embodiment, the microphone 160 may be operatively coupled to the information handling system 100 via a port (e.g., Universal Serial Bus (USB) port) formed into the information handling system 100 or, alternatively, the microphone 160 may be formed into the housing of the information handling system 100. Similarly, the camera 162 may be operatively coupled to the information handling system 100 via a port (e.g., USB port) or, alternatively, be formed into the housing of the information handling system 100. In an embodiment, the camera 162 may be any type of image or video capturing device such as a webcam. In an embodiment, the keyboard 144 may be operatively coupled to the information handling system 100 via a port or, alternatively, be formed into the housing of the information handling system 100.

It is appreciated that other data may be received from other peripheral devices and may be used as user-query input as described herein. For example, the keyboard 144 may be used to receive text input from the user and pass that text to the A/V encrypted filter driver 197 or other filter driver executing via a hardware processor such that this text data cannot be accessible to any unauthorized process being executed on the information handling system or externally. As described herein, this text data may also be encrypted and made accessible to only those unprivileged software process that have an encryption key to access. Additionally, any unprivileged software process that is provided with this encryption key may access this text data and identify a capability associated with one or more AI productivity tool-enablable software applications to perform a capability intent action. It is also appreciated that other types of user-query input may also be provided such as images and computer files. Again, this data may be provided at the AI productivity tool software module and the first unprivileged software process 191 may direct that this data be encrypted and made accessible to only those unprivileged software process that have an encryption key to access. Thus, although the present specification describes the incoming user-query input as audio and/or video data, the present specification also contemplates that text and image input may be used as user-query input as well.

As described, the audio and/or video data from the microphone 160 and/or camera 162 may be temporarily stored at an audio/video input stack 196 buffer memory. This A/V data is passed to the A/V encrypted filter driver 197 which executes computer-readable program code instructions to encrypt the A/V data with a first A/V data encryption key received from an authorized first AI productivity tool unprivileged software process or other first software process 191 that is generated by a first encryption key generator 198-1 of the first unprivileged software process 191. The encrypted A/V data of a user query input is stored on an encrypted buffer 195 within a kernel system memory 194. The kernel system memory 194 may be formed within kernel space 193 such that the audio and/or video stored on the encrypted buffer 195 is inaccessible to unauthorized processes being executed on the information handling system 100 or remotely accessory information handling systems 100. In the present specification and in the appended claims, the term kernel space 193 is meant to be understood as a separate region of a memory device such a RAM memory space that is strictly reserved for running a privileged operating system kernel, kernel extensions, and some device drivers. Kernel space 193 may be differentiated from user space that is described as a portion of the memory (e.g., RAM) where application software and some device drivers execute and requires specific permissions to access. Additionally, in the present specification and in the appended claims, the term unprivileged software process of the OTB AI productivity tool or other software process is meant to be understood as any instance of computer-readable program code instructions that is being executed by a hardware processor of the information handling system 100 for the AI productivity tool software module 164 or other software (e.g., any of AI productivity tool-enablable software applications 184). An unprivileged software process of an OTB AI productivity tool or other software process may include both user-facing and background executing processes. In the context of the present specification, the unprivileged software process of the OTB AI productivity tool or other software processes being executed on the information handling system 100 may only access the audio and/or video data stored on the kernel system memory 194 if the first unprivileged software process of an OTB AI productivity tool or other first unprivileged AI productivity-tool or software process 191 was authorized in directing the gathering of the audio and/or video data and provided an encryption key, generated by its encryption key generator 198-1, to the second unprivileged software process of an OTB AI productivity tool or other second software process 192.

During operation, in an example embodiment, the first unprivileged software process 191 of an OTB AI productivity tool or other software application may direct that audio and/or video from the microphone 160 and/or camera 162 be protected. This first unprivileged software process 191 of an OTB AI productivity tool or other software process may include, for example, the OTB AI productivity tool software module 164 acting as a chatbot that receives user-query input from the user via the microphone 160 and/or camera 162. As described herein, the user may provide this user-query input to the OTB AI productivity tool software module 164 to request a responsive action to be executed as described herein in an example embodiment. In an embodiment, the audio and/or video data may be relayed from the microphone 160 and camera 162 to an audio/video input stack 196 buffer. Concurrently, an encryption key generator 198-1 of the first unprivileged software process 191 of an OTB AI productivity tool or other software process may generate a first encryption key to be used to secure the audio and/or video data via execution of computer-readable program code instructions of the A/V encrypted filter driver 197. The hardware processor (e.g., 102) executing computer-readable program code instructions of the A/V encrypted filter driver 197 uses this first encryption key to encrypt A/V data to be stored on the encrypted buffer 195 in the kernel space preventing unauthorized access without the encryption key.

The encryption key may be transmitted to the audio/video encryption filter driver 197 from encryption key generator 198-1 of the first unprivileged software process 191 via the OTB AI productivity tool software module 164 for the audio/video encryption filter driver 197 to allocate a portion of the kernel system memory 194 (e.g., on an encrypted buffer 195) for storing the encrypted audio and/or video data. In an embodiment, the audio/video encryption filter driver 197 may return a memory handle to the first unprivileged software process 191 of an OTB AI productivity tool or other software process 191 (e.g., one of the processes of the OTB AI productivity tool software module 164) that identifies the location of the audio and/or video data on the encrypted buffer 195 on the kernel system memory 194.

In one embodiment, the first unprivileged software process of an OTB AI productivity tool or other software process 191 (e.g., one of the processes of the OTB AI productivity tool software module 164) may also provide a copy of the encryption key from the encryption key genera-tor 198-1 to a second unprivileged software process 192 of an OTB AI productivity tool or other software process 192 via a secure communication. Still further, the memory handle that identifies the location of the audio and/or video data on the encrypted buffer 195 may also be provided to the second unprivileged software process of an OTB AI pro-ductivity tool or other software process 192 by the first unprivileged software process of an OTB AI productivity tool or other software process 191 in the secure transmis-sion. The A/V encrypted filter driver 197 may encrypt and securely store the A/V data and return the memory handle (e.g., location) to the first unprivileged software process 191 which may then forward the handle to the second unprivi-leged software process 192. This second unprivileged soft-ware process 192 of an OTB AI productivity tool or other software process may be any other process that the first unprivileged software process 191 of an OTB AI produc-tivity tool or other software process has authorized to access the audio and/or video data. A second unprivileged software process 192 may include, in an example embodiment, a software process of the intent identification software appli-cation 170 such as an embedding process using the query input-to-intent ML model algorithm 179 or another AI productivity tool or other software process. As described herein, the computer-readable program code of the intent identification software application 170 is executed to cause the invocation the one or more ML model algorithms 177, 179, 181 in order to identify a capability that could fulfill an intent based on the user-query input and may involve a second unprivileged software process 192 of an OTB AI productivity tool or other software process or even a third unprivileged software process 175 of an OTB AI produc-tivity tool or other software process authorized to determine or execute a responsive capability intent action to a received user query input. The identified capability may be associated with any AI productivity tool-enablable software application 184 that can execute a capability intent action based on the user-query input and identified capability.

In an embodiment, the first unprivileged software process 191 of an OTB AI productivity tool or other software process (e.g., one of the processes of the OTB AI produc-tivity tool software module 164 or any other process) may further specify cleanup data that defines how and if the saved audio and/or video data on the encrypted buffer 195 is to be deleted. In an example embodiment, the first unprivileged software process of an OTB AI productivity tool or other software process 191 may provide or point to a memory-erasure algorithm that defines if, when, and how any data in the encrypted buffer 195 is deleted, including the audio and/or video data, maintained on the encrypted buffer 195 of the kernel system memory 194. In an embodiment, the hardware processor may conduct the deletion of the data in the encrypted buffer 195 pursuant to the memory-erasure algorithm. This memory-erasure algorithm may define if and when the audio and/or video data is to be deleted after a first or subsequent access by a second unprivileged software process 192 of an OTB AI productivity tool or other software process, whether the permission to delete the audio and/or video data is to be provided solely by the first unprivileged software process 191 of an OTB AI produc-tivity tool or other software process (e.g., an originating process), and if and what time limit is provided until the audio and/or video data is to be deleted. It is appreciated that any type of condition or algorithm may be provide that dictates if, by what, and when the stored audio and/or video data is to be deleted from the encrypted buffer 195 and the present specification contemplates these other conditions and algorithms.

In an embodiment, in order to securely transmit the encryption key from the first unprivileged software process 191 of an OTB AI productivity tool or other software process to the second unprivileged software process 192 of an OTB AI productivity tool or other software process, the first unprivileged software process 191 of an OTB AI productivity tool or other software process and second unprivileged software process 192 of an OTB AI produc-tivity tool or other software process may initiate a secure communication channel using, for example, a mutual trans-port layer security (MTLS) protocol or secure production identity framework for everyone (SPIFFE) protocol. This secure communication protocol may prevent third-parties from gaining access to the encryption key and in those instances where the encryption key is transferred from the first unprivileged software process 191 of an OTB AI productivity tool or other software process to the second unprivileged software process 192 of an OTB AI produc-tivity tool or other software process in user space.

In some embodiments, the first unprivileged software process 191 of an OTB AI productivity tool or other soft-ware process a third unprivileged software process 175 of an OTB AI productivity tool or other software process may each provide a first encryption key and a second encryption key to the intent identification software application 170 operating as a second unprivileged software process 192 of an OTB AI productivity tool or other software process in addition to the first unprivileged software process 191 of an OTB AI productivity tool or other software process provid-ing the first encryption key to the audio/video encryption filter driver 197 as described herein. In this example embodi-ment, the first encryption key from the encryption key generator 198-1 of the first unprivileged software process 191 of an OTB AI productivity tool or other software process allows the audio/video encrypted filter driver 197 to encrypt and securely store audio/visual data of a user query input in an encrypted buffer 195 on kernel system memory 194. This first encryption key sent to the intent identification software application 170 and allows the intent identification software application 170, operating as a second unprivileged 192 software process of an OTB AI productivity tool or other software process, to securely access the audio and/or video data stored on the encrypted buffer 195.

The intent identification software application 170 operat-ing as the second unprivileged software process 192 of an OTB AI productivity tool or other software process may also use that audio and/or video data to determine a query intent value or even a matching capability intent and responsive capability intent action to perform an identified capability associated with one or more AI productivity tool-enablable software modules 184 as described in embodiments herein. The intent identification software application 170 encrypts and stores this output in the same encrypted buffer 198 or a second encrypted buffer in kernel system memory 194 with the second encryption key generated via an encryption key generator 198-3. The second encryption key received from the third unprivileged software process 175 of an OTB AI productivity tool or other software process may be used by the intent identification software application 170, operating as the second unprivileged software process 192 of an OTB AI productivity tool or other software process to encrypt the output of the one or more ML model algorithms 177, 179, 181 invoked by the intent identification software application 170. In an embodiment, the first unprivileged software process 191 of an OTB AI productivity tool or other software process may include one or more processes of the AI productivity tool software module 164 while the third unprivileged software process of an OTB AI productivity tool or other software process 175 includes one of the AI productivity tool-enablable software applications 184. The output from the ML model algorithms 177, 179, 181 invoked by the intent identification software application 170 are encrypted with the second encryption key known only to the third unprivileged software process 175 such that only the AI productivity tool-enablable software application 184 as the authorized third unprivileged software process 175 of an OTB AI productivity tool or other software process has the second encryption key and can access this output from encrypted storage in the second encrypted buffer. This may, for example, protect embedded intent values or meaning of audio/visual user query input data.

The systems and methods described herein secures generated audio and/or video data from access by unauthorized processes executing on the information handling system 100. The audio/video encryption filter driver 197 using the first encryption key from the encryption key generator 198-1 from the first unprivileged software process 191 of an OTB AI productivity tool or other software process encrypts user-identifying data within the audio and/or video data of user query input data such that it is made inaccessible to third-party or an unprivileged software process that does not have or has not acquired the first encryption key from the first unprivileged software process 191. An authorized second unprivileged software process 192 of an OTB AI productivity tool or other software process may be securely provided the first encryption key to access the first encrypted buffer 195 in kernel system memory 154 for access this A/V data in some embodiments. Still further, output from the intent identification software application 170 that may be the second unprivileged software process 192 of an OTB AI productivity tool or other software process and the ML model algorithms it has invoked may also be protected from access by a third-party or an unprivileged software process that has not received a second encryption key that may be generated by an authorized third unprivileged software process 175 used to encrypt and securely store output from the second unprivileged software process in the kernel system memory 194 in an encrypted buffer 195.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
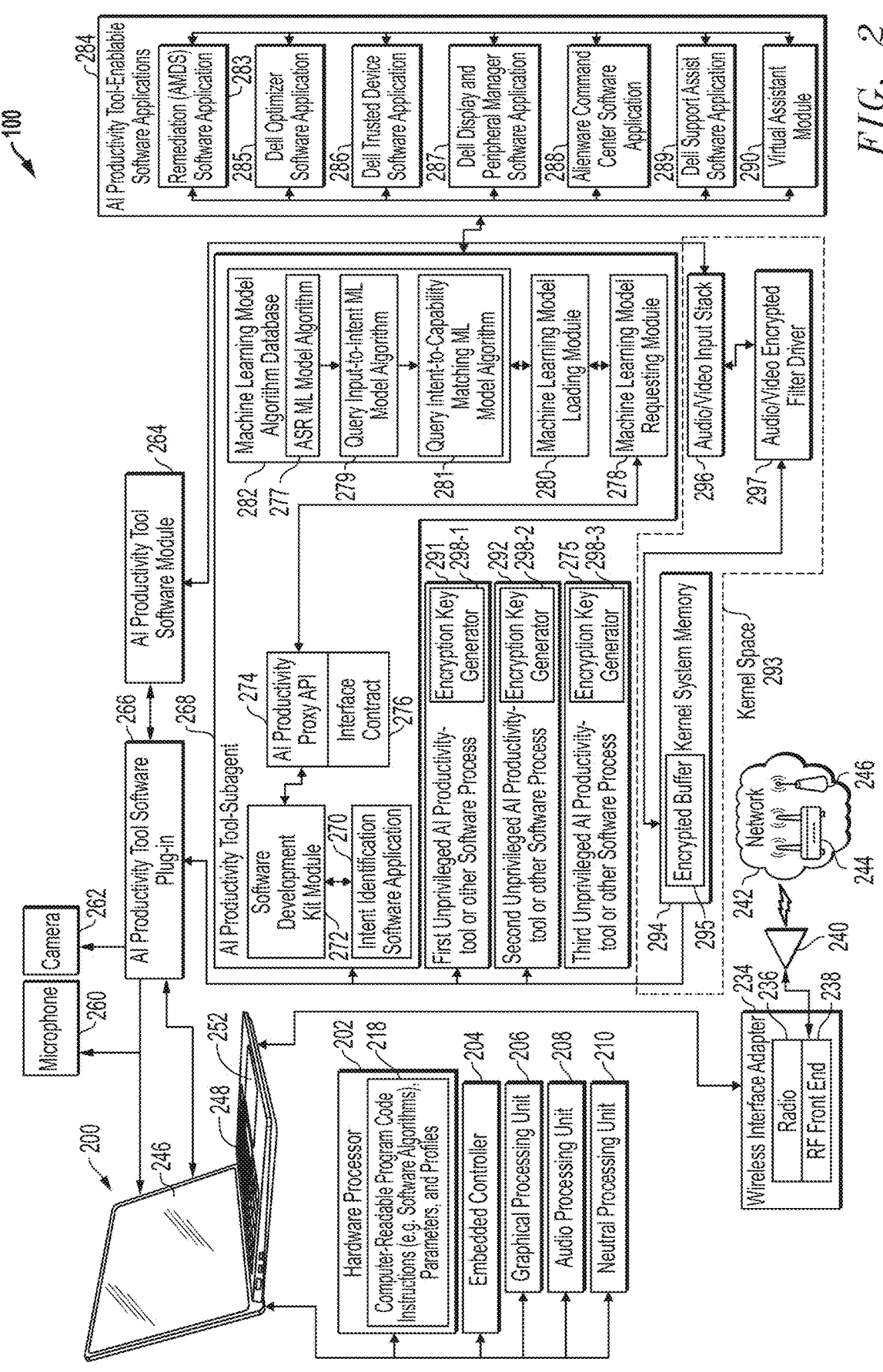
FIG. 2 is a graphic and block diagram illustrating an information handling system that includes computer-readable program code instructions of an audio/video encryption filter driver to control access for a second unprivileged software process to audio and video data in an encrypted buffer encrypted by a first unprivileged software process of an OTB AI productivity tool software module via use of one or more encryption keys according to an embodiment of the present disclosure.

FIG. 2 is a graphic and block diagram illustrating an information handling system 200 that includes computer-readable program code instructions of an audio/video encryption filter driver 297 to control access to audio and video data securely stored in an encrypted buffer by a first unprivileged AI productivity-tool or other first software process 291 for secure access by a second unprivileged software process 292 or a third or other unprivileged software process 275 of an OTB AI productivity tool software module 264 or other software application.

In various embodiments of the present disclosure, one or more of the first unprivileged AI productivity-tool or other first software process 291 for secure access by a second unprivileged software process 292 or a third or other unprivileged software process 275 of an OTB AI productivity tool software module 264 or other software application may have an encryption key generator 298-1, 298-2, or 298-3 to issue encryption keys for audio video data or processed audio video data encryption of a user query input for later secure access by later software processes during operation of the OTB AI productivity tool software module 264. The information handling system 200 shown in FIG. 2 is shown as a laptop-type information handling system 200. In an embodiment, the information handling system 200 includes a video display device 246 to provide output to the user and a keyboard 248, a trackpad 252, a microphone 260, and a camera 262 for the user to provide input to the information handling system 200. In an embodiment, as described herein, the microphone 260, keyboard 248, or the camera 262 may be used by the user to provide user-query input directed to OTB AI productivity tool software module 264 and causing the intent identification software application 270 to identify a capability associated with an AI productivity tool-enablable software application 284 to initiate a responsive capability intent action at the information handling system 200.

Indeed, it is appreciated that other data may be received from other peripheral devices and may be used as user-query input as described in some embodiments herein. For example, the keyboard 244 may be used to receive text input from the user and pass that text to the A/V encrypted filter driver 297 or other filter driver executing via a hardware processor such that this text data cannot be accessible to any unauthorized process being executed on the information handling system or externally. As described herein, this text data may also be encrypted and made accessible to only those unprivileged software process that have an encryption key to access. Additionally, any unprivileged software process that is provided with this encryption key may access this text data and identify a capability associated with one or more AI productivity tool-enablable software applications to perform a capability intent action. It is also appreciated that other types of user-query input may also be provided such as images and computer files. Again, this data may be provided at the AI productivity tool software module and the first unprivileged software process 291 may direct that this data be encrypted and made accessible to only those unprivileged software process that have an encryption key to access. Thus, although the present specification describes the incoming user-query input as audio and/or video data, the present specification also contemplates that text and image input may be used as user-query input as well.

As described in embodiments herein, the information handling system 200 includes computer readable code instructions of an OTB AI productivity tool software module 264 and an AI productivity tool subagent 268 executable by a hardware processor 202 or other hardware processing resource (e.g., an embedded controller 204) to receive user-query input and provide that user-query input to the AI productivity tool subagent 268. In an embodiment, the execution of the computer-readable program code instructions 218 of the AI productivity tool subagent 268 by the hardware processor 202 or any other hardware processing device selects among a plurality of machine learning (ML) model algorithms 277, 279, 281 maintained within a ML model algorithm database 282 for use with execution of a plurality of AI productivity tool-enablable software applications 284 (e.g., 283, 285, 286, 287, 288, 289, 290) during execution of the OTB AI productivity tool software module 264 according to another embodiment of the present disclosure. As described herein, the computer-readable program code instructions 218 of the OTB AI productivity tool software module 264 and AI productivity tool subagent 268 may be executed by a hardware processor 202 on the information handling system 200 thereby allowing the methods described herein to be carried out on-the-box such that a wired or wireless network connection to a network is not necessary for operation of the method. In another embodiment, some modules, databases, and/or processing resources may be maintained on a remote server such that a wired or wireless network connection can be made with these remote servers and the method may be implemented as described herein.

The AI productivity tool software module 256, also referred to as an OTB AI productivity tool software module 256 in embodiments herein, may include any artificial intelligence-based productivity tool to assist in interfacing with and execution of one or more AI productivity tool-enablable software applications 284 or inputs and responses from a user of an information handling system 200. The AI productivity tool software module 264 may be loaded on-the-box by a manufacturer in software and may include chatbot features, virtual assistant features, and other artificial intelligence features that allow a user to provide input to the information handling system 200 and, with generative artificial intelligence processing of a user input query, execute one or more capabilities that include hardware operations, functions, software services, or responses using one or more AI productivity tool-enablable software applications 284. Examples of some AI productivity tool software modules 264 may include Cortana® by Microsoft®, Copilot® by Microsoft®, Siri® by Apple® Inc., Gemini® by Google AIR, ChatGPT® by OpenAI®, and Amazon Alexa® by Amazon®, among others. It is appreciated that the information handling system 200 may include any proprietary AI productivity tool software module 264 installed by an information handling system 200 manufacturer and used to interface with the information handling system 200 and the operations thereon. In various embodiments, the hardware processor 202 or other alternative hardware processing resources of the information handling system 200 may execute computer-readable program code instructions of the AI productivity tool software module 264 with its AI productivity tool plug-in 266 and monitor for user input for a user query at a microphone 260, keyboard 252, camera 262, or other input device for the AI productivity tool subagent 268 to engage in capability intent actions pursuant to the user query input.

The AI productivity tool software module 264, executing on the hardware processor 202 or other hardware processing resource (e.g., EC 204, GPU 206, APU 208, or NPU 210), may interface with other hardware components and with the AI productivity tool-enablable software applications 284 as well as one or more ML module algorithms 277, 279, 281 via an AI productivity tool plug-in 266. The AI productivity tool plug-in 266 may be any software or firmware that allows the AI productivity tool subagent 268 to perform one or more AI productivity tool software processes or other software processes, such as those from AI productivity tool-enablable software applications 284, at the information handling system 200 based on user-query input (e.g., typed, spoken words, images, etc.) provided from the user. The AI productivity tool plug-in 266 may be used by the AI productivity tool software module 264 and AI productivity tool subagent 268 to interface with any number of AI productivity tool-enablable software applications 284 executing or executable on the information handling system 200 according to embodiments herein.

Again, the information handling system 200 also includes the AI productivity tool subagent 268 associated with the AI productivity tool software module 264. The AI productivity tool subagent 268 may be any software and/or firmware executable by the hardware processor 202 of the information handling system 200 to interface one or more of the plurality of the AI productivity tool-enablable software applications 284 (such as a remediation (AMDS) software application 283, Dell® Optimizer® software application 285, Dell® Trusted Device® software application 286, Dell® Display and Peripheral Manager® software application 287, Alienware® Command Center® (AWCC) software application 288, Dell® Support Assist® software application 289, and a virtual assistant module 290) to provide AI enabled capabilities within those AI productivity tool-enablable software applications 284 (e.g., 283, 285, 286, 287, 288, 289, 290) for AI productivity tool or other software processes for responsive hardware, firmware, or software operations, functions, software services, or responses to user input queries. In an embodiment, the computer-readable program code instructions of the software applications (e.g., AI productivity tool-enablable software applications 284 and modules described herein (e.g., 283, 285, 286, 287, 288, 289, 290) may operate wholly "on-box" within the information handling system 200 or be sub-agents on-box for interfacing with remote software systems executing at remote server locations. In an embodiment, the AI productivity tool subagent 268 may be used to direct the execution of various authorized software process modules in support of the AI productivity tool software module 264 for interface with one or more AI productivity tool-enablable software applications as described in embodiments herein. Additionally, the AI productivity tool subagent 268 may be provided with access to the BIOS and OS of the information handling system 200 to conduct the capability intent actions pursuant to the user's query input provided via the AI productivity tool software module 264 or with an interface of one of the AI productivity tool-enablable software applications 284.

In an embodiment, during operation, the hardware processor 202 or other hardware processing resource (e.g., EC 204, GPU 206, CPU, APU 208, or NPU 210) executes computer-readable program code instructions of the AI productivity tool subagent 268 that includes an intent identification software application 270. The intent identification software application 270 may engage with a machine learning model requesting module 278 to have one or more ML model algorithms 281, 282 283 loaded by a machine learning model loading module 280 and executed on the hardware processor in order to conduct one or more unprivileged AI productivity tool or other software processes 291, 292, or 275 that may be authorized to execute with the AI productivity tool software module 264 during its operation. For example, the one or more unprivileged AI productivity tool or other software processes 291, 292, or 275 may include executable code instructions for converting audio input (or video input) into text, code instructions for determining the query intent value from user-query input audio, video, or text data, code instructions for correlating a query intent value with a capability intent of a capability to be conducted responsive to the received user-query inputs, and code instructions for conducting certain responsive capability intent actions determined responsive to the received user-query input. The execution of the computer-readable program code instructions of the intent identification software application 270 may call a software development kit (SDK) module 272. The SDK module 272 may include any computer-readable program code instructions that is executed by the hardware processor 202 or other hardware processing resource to request that a ML model algorithm 277, 279, 281 be invoked to support the one or more unprivileged AI productivity tool or other software processes 291, 292, 275 to identify, in an embodiment, a capability intent action responsive to received user-query inputs from a user and execute such responsive capability intent actions. In an example, the ML model algorithms 277, 279, 281 stored on a machine learning model algorithm database 282 may include an ASR ML model algorithm 277 to generate a text query intent value if any audio is included in the multimodal intent value. The audio ASR ML model algorithm 277 may recognize the speech in the audio and transfer it into text to generate text query intent value. In another embodiment, the ASR ML model algorithm 277 may receive the user-query input as some combination of audio, text, or video/image inputs and generates a vectorized multimodal query intent value for the multimodal user-query input using an embedding algorithm of the query input-to-intent ML model algorithm 279.

In another example, the ML model algorithms 277, 279, 281 may include a query input-to-intent ML model algorithm 279 that receives the user-query input as text or converted audio to text, and with an embedding algorithm generates a vectorized query intent value for the user-query input for later correlation with a capability intent value. In yet another example embodiment, the ML model algorithms may also include a query intent-to-capability matching ML model algorithm 281 that receives the vectorized query intent value or vectorized multimodal query intent value as input, matches the vectorized query intent value or vectorized multimodal query intent value to a vectorized capability intent value associated with the AI productivity tool-enablable software application 284 via a similarity correlation algorithm, and identifies a capability that can serve as the capability intent action responsive to a user-query input. Examples of a query input-to-intent ML model algorithm 279 may include lexical or semantic matching algorithms, such as a semantic cosine similarity matching algorithm in some embodiments.

It is appreciated that execution of computer-readable program code instructions of the selected ML model algorithms 277, 279, 281 to conduct any of the above unprivileged AI productivity tool or other software processes 291, 292, or 275 must satisfy an interface contract 276 requested by the intent identification software application 270 for the execution of the ML model algorithm. With the satisfaction of the interface contract 276, the query intent value from the user-query inputs may be interpreted and an available capability associated with one of the plurality of AI productivity tool-enablable software applications 284 can be statistically correlated via semantic or lexical similarity matching to the query intent value of the user-query input from the user, and the capability may be executed as a responsive capability intent action as the various unprivileged AI productivity tool or other software processes 291, 292, or 275 in embodiments herein. The interface contract 276 described herein defines the requirements that selected ML model algorithms 277, 279, 281 are to have in order to be able receive a specific type of input from the intent identification software application 270 or any AI productivity tool-enablable software applications 284 and to provide a specific type of output to the intent identification software application 270 and/or AI productivity tool-enablable software applications 284 for the various unprivileged AI productivity tool or other software processes 291, 292, or 275 that are authorized for execution with steps of operations by the AI productivity tool software module 264. In an embodiment, the interface contract 276 is generated by an AI productivity proxy API 274 invoked by the SDK module 272 in order to identify the specific ML model algorithm 277, 279, 281 that provides the appropriate inputs or outputs to the unprivileged AI productivity tool or other software processes 291, 292, or 275 that are authorized for execution with steps of operations by the AI productivity tool software module 264, such as with intent identification software application 270 or AI productivity tool-enablable software application 284.

As described herein, a user may provide user-query input to the information handling system 200 in order to have an intent action to be performed on the information handling system 200. This user-query input may be received by the information handling system 200 when the user engages with a first unprivileged AI productivity-tool or other first software process 291 of the AI productivity tool software module 264. In an example embodiment, this first unprivileged AI productivity-tool or other first software process 291 may be a chatbot interface with the AI productivity tool software module 264 for receiving audio, video or text data for a user query input. In an embodiment, this first unprivileged AI productivity-tool or other first software process 291 may initiate the process of receiving the user-query input as audio, video or text data and direct other unprivileged software processes to engage in the AI productivity processes described herein. In an example embodiment, a user may provide input such as "Make my computer perform faster." This user-query input may be received from the user via the microphone 260 and/or the camera 262. In an embodiment, the microphone 260 and the camera 262 may operate as a webcam that captures the user's voice and image. In another embodiment, the microphone 260 and camera 262 may operate independently of each other and may independently receive audio or video as user-query input. Alternatively, the user query input may be received as text, such as via a keyboard or other input/output device in some embodiments. Audio or video data as well as text input may include particular personal private information or images or voice data that is personal and in need of protection for users such that unauthorized, unprivileged process cannot access this audio, video or text data for capture and use or transmission for uses unauthorized by a user. For example, audio or video data could be captured and used with deep fake generation based on phrasing, cadence, images, or other features of the raw audio or video data captured.

As described in some example embodiments herein, the first unprivileged AI productivity-tool or other first software process 291 may be the AI productivity tool software module 264 receiving a user query input as audio or video data via the AI productivity tool software plug-in 266 via microphone 260 or camera 262. As described herein, the audio or video user query input may be separately stored at the audio/video input stack 296 buffer memory temporarily. The audio/video input stack 296 may include any layered architecture of software, firmware, and/or hardware that work together to capture, process, transmit and render audio and video input. In the context of embodiments the present specification, the audio/video input stack 296 may initially cause the audio and video input from the microphone 260 and camera 262 to be captured and then transmit that audio and video input to the audio/video encrypted filter driver 297 for encryption. Concurrently, the first unprivileged AI productivity-tool or other first software process 291 may transmit a first encryption key generated by a first encryption key generator 298-1 to the audio/video encrypted filter driver 297.

In an embodiment, each of the first unprivileged AI productivity-tool or other first software process 291, second unprivileged software process of an OTB AI productivity tool or other software process 292, and/or third unprivileged software process of an OTB AI productivity tool or other software process 275 may be associated with an encryption key generator 298-1, 298-2, 298-3. Encryption key generators 298-1, 298-2, or 298-3 may be used to generate a first encryption key and any other encryption key used to encrypt the captured audio/video user query input data as it is processed at any step for use by any later unprivileged AI productivity-tool or other process 291, 292, or 275 authorized during operations of the AI productivity tool software module 264 or any AI productivity tool-enablable software application 284. In an alternative embodiment, a dedicated encryption key generator (not shown) apart from any unprivileged software process of an OTB AI productivity tool or other software process may be accessed by the first unprivileged AI productivity-tool or other first software process 291 to generate this first encryption key. The audio/video encrypted filter driver 297 may encrypt the received audio and video input from the audio/video input stack buffer 296 (obtained from the user-query input via the microphone 260 and/or camera 262) using the first encryption key. The encryption key generators 298-1, 298-2, 298-3 may use any symmetric, or even asymmetric, data encryption algorithms including an Advanced Encryption Standard (AES), Data Encryption Standard (DES), Triple DES, Rivest-Shamir-Adleman (RSA) Security encryption, International Data Encryption Algorithm (IDEA), Blowfish encryption, Twofish encryption, or other types of encryption algorithms for generating encryption keys according to embodiments herein.

In an embodiment, in addition to the first encryption key, the first unprivileged AI productivity-tool or other first software process 291 may transmit a request for the audio/video encrypted filter driver 297 to allocate a portion of the kernel system memory 294 within the kernel space 293 for storing the encrypted audio and/or video data. In an embodiment, this kernel system memory 294 may be a dedicated portion of the RAM and may include an encrypted buffer 295 that maintains the encrypted audio and video data describing the audio and video input. The first unprivileged AI productivity-tool or other first software process 291 may further specify cleanup data that defines how and if the saved audio and/or video data on the encrypted buffer 295 is to be deleted. In an example embodiment, the first unprivileged AI productivity-tool or other first software process 291 may provide or point to a memory-erasure algorithm that defines if, when, and how any data in the encrypted buffer 295 is deleted, including the audio and/or video data, maintained on the encrypted buffer 295 of the kernel system memory 294. In an embodiment, the hardware processor may conduct the deletion of the data in the encrypted buffer 295 pursuant to the memory-erasure algorithm. This memory-erasure algorithm may define if and when the audio and/or video data is to be deleted after a first or subsequent access second unprivileged AI productivity-tool or other second software process 292 or a third or other unprivileged AI productivity-tool or other software process 275 using a first encryption key or a later-generated encryption key. The memory-erasure algorithm may also define whether the permission to delete the audio and/or video data is to be provided solely from the first unprivileged AI productivity-tool or other first software process 291 (e.g., an originating process or as transmitted to a second or third unprivileged AI productivity-tool or other third software process 292 or 275), and if and what time limit is to be provided until the audio and/or video data is to be deleted after initial storage or after an authorized access of that data. It is appreciated that any type of condition or algorithm may be provide that dictates if, by what, and when the stored audio and/or video data is to be deleted from the encrypted buffer 295 and the present specification contemplates these other conditions and algorithms.

In one embodiment of the present disclosure, the audio and video data stored on the encrypted buffer 295 of the kernel system memory 294 may be accessible to the first unprivileged AI productivity-tool or other first software process 291 and any other unprivileged software process via use of a copy of the first encryption key securely transmitted to that second unprivileged AI productivity-tool or other second software process 292. For example, the first unprivileged AI productivity-tool or other first software process 291 may transmit a copy of the first encryption key generated via an encryption key generator 298-1 to a second unprivileged AI productivity-tool or other second software process 292 to gain access to this encrypted audio and video data for a later step in processing the user query input during operations of the AI productivity tool software module 264.

In an embodiment, in order to securely transmit the first encryption key from the first unprivileged AI productivity-tool or other first software process 291 to the second unprivileged AI productivity-tool or other second software process 292, the first unprivileged AI productivity-tool or other first software process 291 and second unprivileged AI productivity-tool or other second software process 292 may initiate a secure communication channel using, in some example embodiments, a mutual transport layer security protocol or secure production identity framework for everyone (SPIFFE) protocol. This secure communication protocol may prevent third-parties from gaining access to the encryption key and in those instances where the encryption key is transferred from first unprivileged AI productivity-tool or other first software process 291 to the second unprivileged AI productivity-tool or other second software process 292 in user space. In this manner, the second unprivileged AI productivity-tool or other second software process 292 may be allowed by the first unprivileged AI productivity-tool or other first software process 291 to gain access to the audio and video data stored on the encrypted buffer 295. In a further embodiment, to securely transmit the first encryption key from the first unprivileged AI productivity-tool or other first software process 291 to the audio/video encrypted filter driver 297, the first unprivileged AI productivity-tool or other first software process 291 and the audio/video encrypted filter driver 297 may similarly initiate a secure communication channel using, in some example embodiments, a mutual transport layer security protocol or SPIFFE protocol. Then the audio/video encrypted filter driver 297 may execute to encrypt the received audio/video data of the user query input for storage in the encrypted buffer 295 of the kernel system memory.

In other embodiments of the present disclosure, the first unprivileged AI productivity-tool or other first software process 291 and a third unprivileged AI productivity-tool or other third software process 275 may each provide a first encryption key and a second encryption key, respectively, to the intent identification software application 270 as well as the audio/video encrypted filter driver 297. The intent identification software application 271 may operate as a second unprivileged software process for processing the user query input as part of processing by the AI productivity tool software module 264 for generating responsive capability intent actions. Secure communication channels may be used between the first unprivileged AI productivity-tool or other first software process 291 providing the first encryption key to the audio/video encryption filter driver 297 as well as the second unprivileged AI productivity-tool or other second software process 292 that is the intent identification software application 270 as described herein. Additionally, a secure communication channel may be established to transmit a second encryption key from a third unprivileged AI productivity-tool or other third software process 275 to the second unprivileged AI productivity-tool or other second software process 292 that is the intent identification software application 270 in an embodiment herein.

In this example embodiment, the first encryption key from the first unprivileged AI productivity-tool or other first software process 291 is used to encrypt the received audio/video user query intent data in encrypted buffer 295 as before and allows the intent identification software application 270, as the second unprivileged AI productivity-tool or other second software process 292, to securely access the audio and/or video data stored on the encrypted buffer 295 to determine a user query intent value from the raw audio/video data of the user query input. The intent identification software application 270 operates as the second unprivileged AI productivity-tool process or other second software process 292 uses that audio and/or video data to determine the query intent value. The intent identification software application 270 operating as the second unprivileged AI productivity-tool process or other second software process 292 may even further process that audio and/or video data with a later step for a matching to capability intent and responsive capability intent action processing step of the AI productivity tool software module 264 as described herein. The intent identification software application 270 operating as the second unprivileged AI productivity-tool process or other second software process 292 encrypts its output (e.g., a query intent value) with the second encryption key received from the third unprivileged AI productivity-tool or other third software process 275 for storage at the same encrypted buffer 295 or a separate second encrypted buffer in kernel system memory 294 in other embodiments.

The second encryption key received from the third unprivileged AI productivity-tool or other third software process 275 may be used by the intent identification software application 270 as the second unprivileged software process of an OTB AI productivity tool or other software process 292 to encrypt the output of the one or more ML model algorithms 277, 279, 281 invoked by the intent identification software application 270. In an embodiment, this second unprivileged AI productivity-tool or other process 292 as the intent identification software application 270 may include one or more processes of the AI productivity tool software module 264 and is authorized by the same to operate as well as receive the first and second encryption keys. The third unprivileged AI productivity-tool or other third software process 275 includes operations of one of the AI productivity tool-enablable software applications 284 that are also authorized for operation by the AI productivity tool software module 264 to issue the second encryption key and having its issued second encryption key can access this output stored in the second encrypted buffer at the kernel system memory 294 in an embodiment. In such an example embodiment, only the third unprivileged AI productivity-tool process or other third software process 275 can access this step of processed audio and/or video user query input data since only the third unprivileged AI productivity-tool process or other third software process 275 has the second encryption key. In this way, other unauthorized unprivileged software processes may not access the encrypted data in the first or second encrypted data buffer (e.g., 295) and the audio/video user query input data is protected at various stages of processing by the OTB AI productivity tool software module 264 or by AI productivity tool-enablable software applications 284.

The systems and methods described herein secures generated audio and/or video data from access by unauthorized processes executing on the information handling system 200. With the audio/video encryption filter driver 297 using the first encryption key given to it and the second unprivileged AI productivity-tool or other second software process 292 from the first unprivileged AI productivity-tool or other first software process 291, user-identifying data within the audio and/or video data is made inaccessible to third-party or an unprivileged software process that does not have or has not acquired the first encryption key from the first unprivileged AI productivity-tool or other first software process 291. An authorized second unprivileged AI productivity-tool process or other second software process 292 may be securely provided the first encryption key to access the first encrypted buffer 195 in kernel system memory 154 for access this A/V data in some embodiments. In still further embodiments of the present disclosure, output from the intent identification software application 270 that may operate as the second unprivileged AI productivity-tool process or other second software process 292 and the ML model algorithms it has invoked as authorized by the AI productivity tool software module 264 may also be protected from access by a third-party or an unprivileged software process that has not received a second encryption key.

Figure 3:
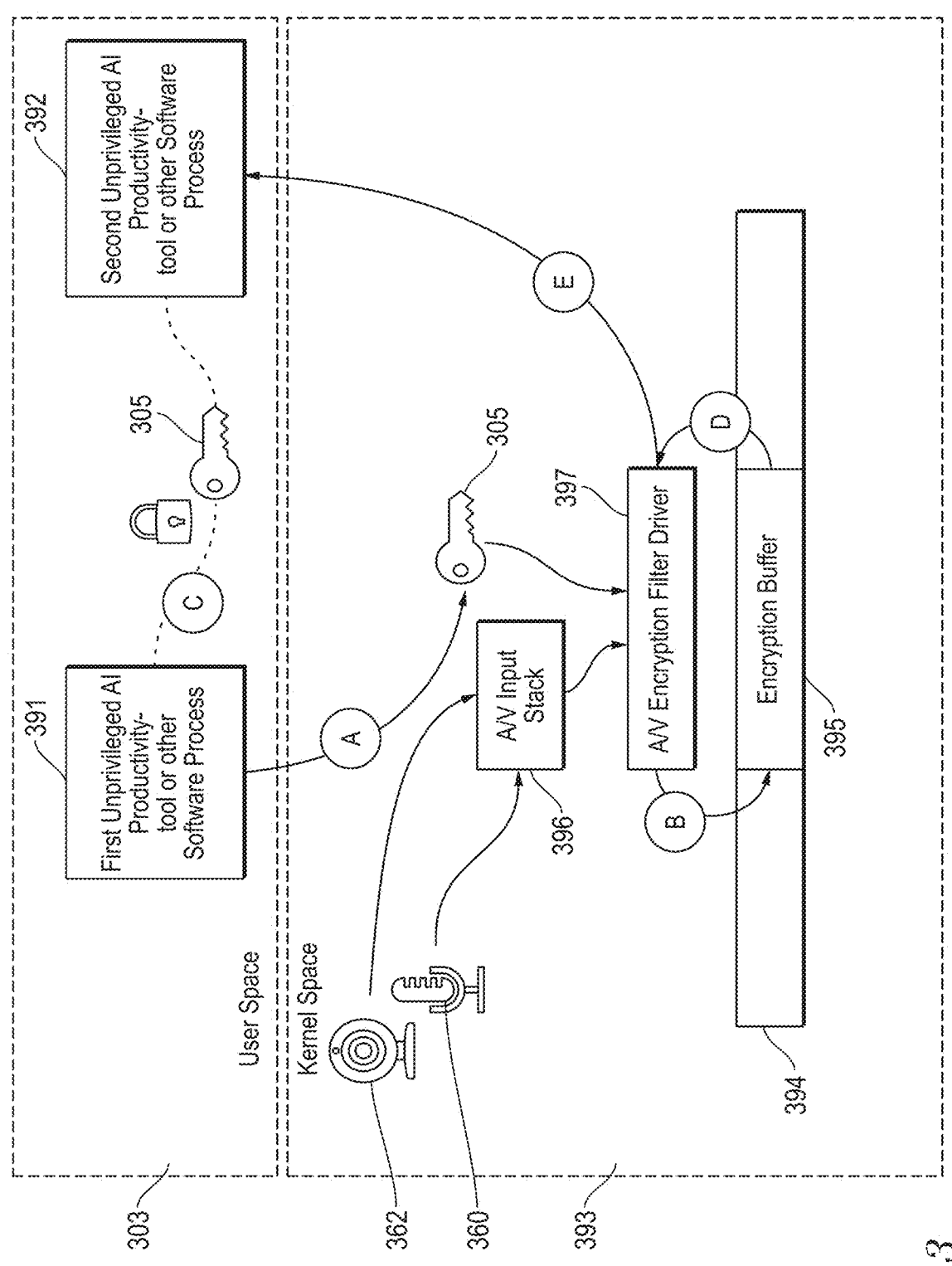
FIG. 3 is a block diagram illustrating a process flow of an audio/video encryption filter driver to control access by a second unprivileged software process to audio and video data in an encrypted buffer as directed by a first unprivileged software process of an AI productivity tool software module via use of an encryption key securely shared between the plural unprivileged software processes according to an embodiment of the present disclosure.

FIG. 3 is a block diagram illustrating a process flow of execution of an audio/video encryption filter driver 397 with an AI productivity tool software module to control access to audio and video data of a user query input in an encrypted buffer as directed by a first unprivileged AI productivity-tool or other first software process 391 according to an embodiment of the present disclosure. Encrypted audio and video data stored in the encrypted buffer 395 may be made available for use in a later step of user query input processing by a second unprivileged AI productivity-tool or other second software process 392 authorized by an AI productivity tool software module via use of an encryption key 305 securely transmitted by the first unprivileged AI productivity-tool or other first software process 391 with an A/V encryption filter driver 397 and another, second unprivileged AI productivity-tool or other second software process 392 according to an embodiment of the present disclosure. FIG. 3 shows some of the steps within the process flow diagram being carried out within a user space 303 while other processes are carried out within a kernel space 393. It is appreciated that those processes that are completed within user space 303 may include security procedures that protect the access to the audio/video input and data from unauthorized third-parties or processes described herein.

In embodiments of the present disclosure, the above-described AI productivity tool or other software process may operate to communicate with one another and may be identified for discussion purposes as a first unprivileged software process of an OTB AI productivity tool or other software process 391 and a second unprivileged software process of an OTB AI productivity tool or other software process 392. Input data, output data, and communication between the first unprivileged OTB AI productivity tool or other software process 391 and the second unprivileged OTB AI productivity tool or other software process 392 or others may contain sensitive or personal information such as cadence, tonality, unique spectral content, grammatical choices, vocabulary, appearance of other features of audio, video or even text input data received as a user query input. Embodiments of the present disclosure provide for secure encryption, storge, and communications of that audio, video or other data as between the first unprivileged OTB AI productivity tool or other software process 391 and the second unprivileged OTB AI productivity tool or other software process 392 when both are authorized software processes of the operations of an AI productivity tool software module executing on an information handling system. It is understood, that the first unprivileged OTB AI productivity tool or other software process 391 and the second unprivileged OTB AI productivity tool or other software process 392 in the example embodiment of FIG. 3 may be any two software processes of the AI productivity tools software module or of an AI productivity tool-enablable software application executing in response to a user query input in embodiments herein.

In an embodiment, a first unprivileged AI productivity-tool or other first software process 391 may direct that audio and/or video from a microphone 360 and/or camera 362 may be secured data for use by the first unprivileged AI productivity-tool or other first software process 391 and any other unprivileged software process (e.g., the second unprivileged AI productivity-tool or other second software process 392) that has been provided a first encryption key. This may include the first unprivileged AI productivity-tool or other first software process 391 sending a requesting signal to the A/V input stack 396 and to an audio/video encryption filter driver 397 executing on the information handling system to encrypt the audio/video data from the microphone 360 and camera 362 with a first encryption key 305 and be saved in a dedicated portion of the kernel system memory 394 and within an encrypted buffer 395. This signal to save and encrypt this audio/video data may, at line "A," include the first encryption key 305 used to encrypt the audio/video data for encryption and storage within the encrypted buffer 395 such that no other unprivileged software process can access that audio/video data without a copy of the first encryption key 305.

Again, is appreciated that other data may be received from other peripheral devices and may be used as user-query input as described in some embodiments herein. For example, the keyboard (not shown) may be used to receive text input from the user and pass that text to the A/V encrypted filter driver 397 or other filter driver executing via a hardware processor such that this text data cannot be accessible to any unauthorized process being executed on the information handling system or externally. As described herein, this text data may also be encrypted and made accessible to only those unprivileged software process that have an encryption key to access. Additionally, any unprivileged software process that is provided with this encryption key may access this text data and identify a capability associated with one or more AI productivity tool-enablable software applications to perform a capability intent action. It is also appreciated that other types of user-query input may also be provided such as images and computer files. Again, this data may be provided at the AI productivity tool software module and the first unprivileged software process 391 may direct that this data be encrypted and made accessible to only those unprivileged software process that have an encryption key to access. Thus, although the present specification describes the incoming user-query input as audio and/or video data, the present specification also contemplates that text and image input may be used as user-query input as well.

In an embodiment, the audio/video input stack 396 may transmit the audio/video data to the audio/video encryption filter driver 397, and the first unprivileged AI productivity-tool or other first software process 391 may have generated and transmit the first encryption key 305 to the audio/video encryption filter driver 397 at "A." The hardware processor of the information handling system may execute computer-readable code instructions of an audio/video encryption filter driver 397 to use the first encryption key 305 to encrypt the audio/video data prior to storing the streaming audio/video data onto the encrypted buffer 395 of the kernel system memory 394. The first encryption key 305 may be transmitted to the audio/video encryption filter driver 397 via a secure communication channel using, for example, a mutual transport layer security (MTLS) protocol or secure production identity framework for everyone (SPIFFE) protocol.

The hardware processor of the information handling system may execute the computer readable code instructions of the audio/video encryption filter driver 397 to encrypt the audio/video data for encryption and storage within the encrypted buffer 395 at line "B." The encrypted buffer 395 is a portion of kernel memory 394 set aside for use by the audio/video encryption filter driver 397 in an embodiment. It may be requested by the first unprivileged AI productivity-tool or other first software process 391 in an embodiment. The encrypted buffer 395 stores the encrypted audio/video data of the user query input, for example, or other later-processed data during operation of the AI productivity tool software module such that no other unprivileged software process can access that audio/video data or a processed version thereof without a copy of the first encryption key 305 and authorization.

In an embodiment, the first unprivileged AI productivity-tool or other first software process 391 (e.g., the AI productivity tool software module or any other process) may further specify cleanup data that defines a memory erasure algorithm of how and if the saved audio and/or video data on the encrypted buffer 395 from line "B" is to be deleted. This cleanup data may be transmitted through the audio/video input stack 396 and audio/video encryption filter driver 397 for the encrypted buffer 395 to use. In an example embodiment, the first unprivileged AI productivity-tool or other first software process 391 may provide or point to a memory-erasure algorithm that defines if, when, and how any data in the encrypted buffer 395 is deleted including any audio and/or video data maintained on the encrypted buffer 395 of the kernel system memory 394. In an embodiment, the hardware processor may conduct the deletion of the data in the encrypted buffer 395 pursuant to the memory-erasure algorithm. This memory-erasure algorithm may define if and when the audio and/or video data is to be deleted after a first or subsequent access by a second unprivileged AI productivity-tool or other second software process 392, for example. Other memory-erasure algorithms may determine whether the permission to delete the audio and/or video data is to be provided solely by the first unprivileged AI productivity-tool or other first software process 391 (e.g., an originating process) or can be accepted by another unprivileged software process, and if and what time limit is provided until the audio and/or video data is to be deleted from the encrypted buffer 395. It is appreciated that any type of condition or algorithm may be provide that dictates if, by what, and when the stored audio and/or video data is to be deleted from the encrypted buffer 395 and the present specification contemplates these other conditions and memory-erasure algorithms for the encrypted buffer 395.

At line "B," the audio/video encryption filter driver 397 may transmit the encrypted user query input audio/video data to the kernel system memory 394 and the encrypted buffer 395. In an embodiment, the encrypted buffer 395 is a dedicated portion of the kernel system memory 394 for use by the first unprivileged AI productivity-tool or other first software process 391 or other unprivileged AI productivity-tool or other processes that have requested that the audio/video data or a later-processed version thereof within the user query input data be saved and protected at the encrypted buffer 395. It is contemplated that any unprivileged AI productivity-tool or other software process executed in the steps of operation of the AI productivity tool software module in determining a responsive capability or executing a responsive capability action may provide the first encryption key 305 for the audio/video encryption filter driver 397 to encrypt process output data (e.g., further-processed user query input data) for storage at encrypted buffer 395 for later, secure retrieval by another unprivileged AI productivity-tool or other software process having the first encryption key 305 according to embodiments of FIG. 3.

As described herein other unprivileged AI productivity-tool or other processes such as the second unprivileged software process of an OTB AI productivity tool or other software process 292 may also be provided access to this encrypted, saved audio/video stored at line "B" if and when the first encryption key 305, or a copy thereof, is provided. At line "C," the first unprivileged AI productivity-tool or other first software process 391 is given the ability to pass onto any other unprivileged software process the encryption key 305 (or a copy of the encryption key 305) for purposes of authorizing, via the AI productivity tool software module, this other unprivileged software process to gain access to the audio/video data stored on the encrypted buffer 395. In the example embodiment shown in FIG. 3, the first unprivileged AI productivity-tool or other first software process 391 shares the encryption key 305 with the second unprivileged AI productivity-tool or other second software process 392 as part of the operations of the AI productivity tool software module responding to a user query input.

In an embodiment herein, this step of sharing the first encryption key with the second unprivileged AI productivity-tool or other second software process 392 is conducted in user space 303. In order to protect the transmission of the encryption key 305 from the first unprivileged AI productivity-tool or other first software process 391 to the second unprivileged AI productivity-tool or other second software process 392, a secure communication channel may be created between the first unprivileged AI productivity-tool or other first software process 391 and the second unprivileged OTB AI productivity tool or other software process 392. In an embodiment, in order to securely transmit this encryption key 305 from the first unprivileged AI productivity-tool or other first software process 391 to the second unprivileged AI productivity-tool or other second software process 392, the first unprivileged AI productivity-tool or other first software process 391 and second unprivileged AI productivity-tool or other second software process 392 may initiate a secure communication channel using, for example, an MTLS protocol or SPIFFE protocol. This secure communication protocol may prevent third-parties from gaining access to the encryption key 305 and in those instances where the encryption key 305 is transferred from the first unprivileged AI productivity-tool or other first software process 391 to the second unprivileged AI productivity-tool or other second software process 392 in user space. In addition to providing the encryption key 305 to the second unprivileged AI productivity-tool or other second software process 392, the first unprivileged AI productivity-tool or other first software process 391 may also provide the location handle within the encrypted buffer 395 where the audio/video data has been saved.

At line "D," the encrypted audio/video data stored in the encrypted data buffer 395, upon request from the second unprivileged AI productivity-tool or other second software process 392 (or the first unprivileged AI productivity-tool or other first software process 391 on behalf of the second unprivileged AI productivity-tool or other second software process 392 in an embodiment), the audio/video encryption filter driver 397 retrieves the encrypted audio/video data from the encrypted buffer 395 in its encrypted state. The request to retrieve the audio/video data may be sent from the second unprivileged AI productivity-tool or other second software process 392 to the audio/video encryption filter driver via line "E." Still further, at line "E" the audio/video encryption filter driver 397 may continue to pass this retrieved, encrypted audio/video data onto the unprivileged AI productivity-tool or other software process 392 for decryption by the second unprivileged AI productivity-tool or other second software process 392.

In the context where the first unprivileged AI productivity-tool or other first software process 391 is an AI productivity tool plug-in of an AI productivity tool software module for identifying and receiving a user query input in audio or video data, the second unprivileged AI productivity-tool or other second software process 392 may be, for example, an intent identification software application that receives, as input, the encrypted raw audio/video data that may be user-query input data, decrypt that audio/video user query input data with the first encryption key 305, and process it in one or more software process steps to determine a capability of an AI productivity tool-enablable software application to engage in a capability intent action responsive to the user-query input.

For example, the user may provide user-query input (e.g., audio/video data) via the microphone 360 and/or camera 362 requesting to "Make my computer faster." This audio/video data flows through processes A through E in order for the first unprivileged AI productivity-tool or other first software process 391 of the AI productivity tool software application to encrypt that received raw audio or video user query input data in the encrypted data buffer 395. A second unprivileged AI productivity-tool or other second software process 392, operating as the intent identification software application, may engage in a query input-to-intent ML algorithm to decrypt the raw audio/video user query input data from the encrypted data buffer 395 using the securely received first encryption key. The second unprivileged AI productivity-tool or other second software process 392 may then use the raw audio/video user query input data to convert the raw user query input data into text or embed the user query input into a query intent value.

Later unprivileged AI productivity-tool or other software processes of the operations of the AI productivity tool software module may also be invoked as a second unprivileged AI productivity-tool or other second software process 392 under the embodiment of FIG. 3. For example, query intent-to-capability matching process using a query intent-to-capability matching ML model algorithm may decrypt and use output of a previous software process, such as the embed user query intent values that were encrypted and stored in the encrypted buffer 395 by a execution of a first unprivileged AI productivity-tool or other first software process 391 that included execution of the query input-to-intent ML algorithm above.

Each successive software process of the operations of the AI productivity tool software module of embodiments herein may utilize the embodiment of FIG. 3 in order to secure various levels of unprocessed or processed user query input audio or video data during identification of a responsive capability associated with an AI productivity tool-enablable software application or to execute a responsive capability intent action of the AI productivity tool-enablable software application by the information handling system while safeguarding personal information of the user providing user query inputs. It is this user-query input in the form of audio/video data that is protected in the systems and methods described herein so that a third-party or unauthorized third-party process being executed on the information handling system or elsewhere cannot access the audio/video data of the user query input. This, thereby, prevents these third-parties from using the audio/video data in a nefarious way such as in deep fakes or other potentially harmful purposes thereby protecting capture audio or video of the user's voice and/or face so that these deep fakes cannot be produced from providing user query inputs with the AI productivity tool software module of embodiments herein.

Figure 4:
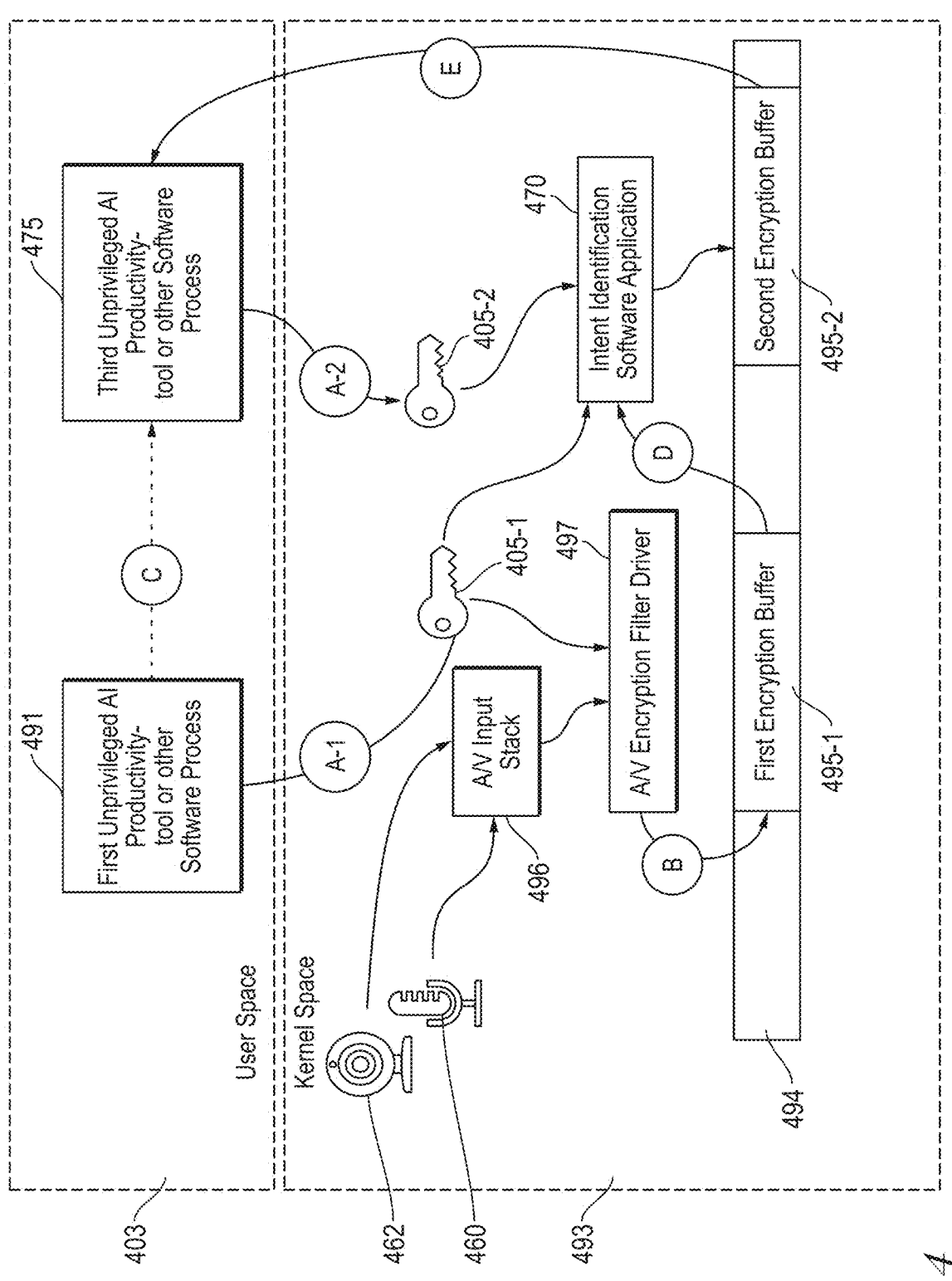
FIG. 4 is a block diagram illustrating a process flow of an audio/video encryption filter driver to control access by a second unprivileged software process to audio and video data in an encrypted buffer as directed by a first unprivileged software process of an AI productivity tool software module via use of plural encryption keys according to another embodiment of the present disclosure.

FIG. 4 is a block diagram illustrating a process flow of an audio/video encryption filter driver to control access to audio and video data of a user query input in an encrypted buffer as directed by a first unprivileged AI productivity-tool or other first software process 491 for access by a third unprivileged AI productivity-tool or other third software process 475 via execution of a second unprivileged AI productivity-tool or other second software process 492 in steps of the operation of an AI productivity tool software module according to embodiments of the present disclosure. The first unprivileged AI productivity-tool or other first software process 491 for access by a third unprivileged AI productivity-tool or other third software process 475 encrypt or access encrypted audio and video data of a user query input or further processed user query input data, such as embedded query intent values, via use of plural encryption keys 405-1, 405-2 according to another embodiment of the present disclosure. Again, FIG. 4 shows some of the steps within the process flow diagram being carried out within a user space 403 while other processes are carried out within a kernel space 493 of operations on an information handling system. It is appreciated that those processes that are completed within user space 403 and interactions with the kernel space 493 may include security procedures that protect the access to the audio/video input and data of a user query input or further processed user query inputs, such as in an embedded query intent value format, from unauthorized third-parties or processes by use of a first encrypted buffer 495-1 and a second encrypted buffer 495-2 described herein.

In embodiments of the present disclosure, the above-described AI productivity tool or other software processes may operate to communicate with one another and may be identified for discussion purposes as a first unprivileged software process of an OTB AI productivity tool or other software process 491, an intent identification software application 470 operating as a second unprivileged software process of an OTB AI productivity tool or other software process 492, and a third unprivileged AI productivity-tool or other third software process 475. Input data, output data, and communication between the first unprivileged AI productivity-tool process or other first software process 491 and the third unprivileged AI productivity-tool process or other third software process 475 or others may contain sensitive or personal information. Embodiments of the present disclosure provide for secure encryption, storge, and communications of user query input data as between the first unprivileged AI productivity-tool process or other first software process 491 and the third unprivileged AI productivity-tool process or other third software process 475 as well as any interim second unprivileged AI productivity-tool process or other second software process 492. In an embodiment, a first unprivileged AI productivity-tool or other first software process 491 may direct that audio and/or video data from a microphone 460 and/or camera 462 may be secured for use by the first unprivileged AI productivity-tool or other first software process 491 and for use by any other authorized unprivileged software process such as the intent identification software application 470 operating as the second unprivileged AI productivity-tool or other second software process 492 via use of a first encryption key 405-1 generated by an encryption key generator of the first unprivileged AI productivity-tool or other first software process 491. Further, use of later processed user query input data stored at a second encrypted buffer 495-1 may be securely used by the third unprivileged AI productivity-tool or other third software process 475 via a second encryption key 405-2 as generated by an encryption key generator of the third unprivileged AI productivity-tool or other third software process 475.

As described herein, other data may be received from other peripheral devices and may be used as user-query input as described in some embodiments herein. For example, the keyboard (not shown) may be used to receive text input from the user and pass that text to the A/V encrypted filter driver 497 or other filter driver executing via a hardware processor such that this text data cannot be accessible to any unauthorized process being executed on the information handling system or externally. As described herein, this text data may also be encrypted and made accessible to only those unprivileged software process that have an encryption key to access. Additionally, any unprivileged software process that is provided with this encryption key may access this text data and identify a capability associated with one or more AI productivity tool-enablable software applications to perform a capability intent action. It is also appreciated that other types of user-query input may also be provided such as images and computer files. Again, this data may be provided at the AI productivity tool software module and the first unprivileged software process 491 may direct that this data be encrypted and made accessible to only those unprivileged software process that have an encryption key to access. Thus, although the present specification describes the incoming user-query input as audio and/or video data, the present specification also contemplates that text and image input may be used as user-query input as well.

The execution of the plural software processes of an AI productivity tool software module to receive a user query input and determine a responsive capability intent action may include the first unprivileged AI productivity-tool or other first software process 491 sending a requesting signal to the audio/video encryption filter driver 497 to have raw audio/video data from the microphone 460 and camera 462 of a user query input from the A/V input stack 496 be encrypted and saved in a dedicated portion of the kernel system memory 494 and within a first encrypted buffer 495-1. This signal to encrypt and save this audio/video data may, at line "A-1," include a first encryption key 405-1 to be used by execution of computer readable code instructions of the audio/video encryption filter driver 497 to encrypt the audio/video data within the first encrypted buffer 495-1. Upon encryption of the audio/visual user query input data in the first encrypted buffer 495-1 via the first encryption key 405-1, no other unprivileged software process that is unauthorized can access that audio/video data without a copy of the first encryption key 405-1. Additionally, first the unprivileged AI productivity-tool or other software process 491 sends the first encryption key 405-1 (or a copy thereof) to an intent identification software application 470 acting as, in this embodiment, the second unprivileged AI productivity-tool or other second software process 492 for the intent identification software application 470 to access the audio and video data saved on the first encrypted buffer 495-1 for further processing in accordance with the AI productivity tool software module operation.

In an embodiment, the audio/video input stack 496 may transmit the audio/video data to the audio/video encryption filter driver 497 and the first unprivileged AI productivity-tool or other first software process 491 may transmit the first encryption key 405-1 to the audio/video encryption filter driver 497 and intent identification software application 470 at line "A-1" as described. The audio/video encryption filter driver 497 may use the first encryption key 405-1 to encrypt the audio/video data prior to storing the user query input audio/video data into the first encrypted buffer 495-1 of the kernel system memory 494 at line "B."

In an embodiment, the first unprivileged AI productivity-tool or other first software process 491 (e.g., the execution of a AI productivity tool plug-in of the AI productivity tool software module to detect user query inputs or any other process) may further specify cleanup data that defines how and if the saved audio and/or video data on the first encrypted buffer 495-1 (or the second encrypted buffer 495-2 in some embodiments) is to be deleted. This cleanup data may be transmitted through the audio/video input stack 496 and audio/video encryption filter driver 497 for the first encrypted buffer 495-1 and second encrypted buffer 495-2 to use. In an example embodiment, the first unprivileged AI productivity-tool or other first software process 491 may provide or point to a memory-erasure algorithm that defines if, when, and how any data in the first encrypted buffer 495-1 and second encrypted buffer 495-2 is deleted including any audio and/or video data maintained on the first encrypted buffer 495-1 (or the second encrypted buffer 495-2) of the kernel system memory 494. In an embodiment, the hardware processor may conduct the deletion of the data in the encrypted buffer 495 pursuant to the memory-erasure algorithm. This memory-erasure algorithm may define if and when the audio and/or video data is to be deleted after a first or subsequent access by a second unprivileged AI productivity-tool or other second software process 492 (e.g., the intent identification software application 470) or the third unprivileged AI productivity-tool or other third software process 475, whether the permission to delete the audio and/or video data is to be provided solely by the first unprivileged AI productivity-tool or other first software process 491 (e.g., an originating process) or can be accepted by another unprivileged software process (e.g., 492, 475), and if and what time limit is provided until the audio and/or video data is to be deleted from the first encrypted buffer 495-1 (or second encrypted buffer 495-2). It is appreciated that any type of condition or algorithm may be provide that dictates if, by what, and when the stored audio and/or video data is to be deleted from the first encrypted buffer 495-1 (or second encrypted buffer 495-2) and the present specification contemplates these other conditions and algorithms.

In an embodiment, the third unprivileged AI productivity-tool process or other third software process 475 may also provide a second encryption key 405-2 to the intent identification software application 470 at line "A-2" concurrently with the first unprivileged AI productivity-tool or other first software process 491. Thus, the third unprivileged AI productivity-tool process or other third software process 475 may be directed or otherwise be managed via a signaling at line "C" by the first unprivileged AI productivity-tool or other first software process 491 to provide a second encryption key 405-2 during steps of the operations of the AI productivity tool software module in determining a responsive capability intent action to a user query input. This occurs while the first unprivileged AI productivity-tool or other first software process 491 provides the first encryption key 405-1 to both the audio/video encryption filter driver 497 and the intent identification software application 470 (second unprivileged AI productivity-tool or other second software process 492) at line "A-1" described above. As described herein, the second encryption key 405-2 provided to the intent identification software application 470 by the third unprivileged AI productivity-tool process or other third software process 475 may be used by the intent identification software application 470 (e.g., acting as the second unprivileged AI productivity-tool or other second software process 492) to gain access to any output from the execution of the intent identification software application 470 encrypted and stored in the second encrypted buffer 495-2.

At line "D", the intent identification software application 470 may use its copy of the first encryption key 405-1 to retrieve the audio/visual user query input data from the first encrypted buffer 495-1 and decrypt the same for use in the second unprivileged AI productivity-tool process or other second software process 492. Execution of the intent identification software application 470 as the second unprivileged AI productivity-tool process or other second software process 492 may generate further processed user query input data from the received and decrypted audio or video data using any ML model algorithm as described herein and then encrypted its output into the second encrypted buffer 495-2 the using the second encryption key 405-2. In this way, only an authorized software process having the second encryption key 405-2, namely the third unprivileged AI productivity-tool or other third software process 475, may access this encrypted audio and video data at line "E" from the second encrypted buffer 495-2.

At line "B," the audio/video encryption filter driver 497 may transmit the user query input audio/video data to the kernel system memory 494 and the first encrypted buffer 495-1. In an embodiment, the first encrypted buffer 495-1, like the second encrypted buffer 495-2, is a dedicated portion of the kernel system memory 494 for use by the first unprivileged AI productivity-tool or other first software process 491 and other unprivileged software processes authorized to access and that have requested that the audio/video data within the user query input be saved and protected at the encrypted buffer 495.

Again, at process "C," the first unprivileged AI productivity-tool or other first software process 491 may request that the third unprivileged AI productivity-tool process or other third software process 475 or any other unprivileged software process generate the second encrypted key 405-2 to secure the output from the intent identification software application 470 executing further processing of the user-query input data (e.g., the audio and video data received at the microphone 460 and/or camera 462). As described herein, communication between the first unprivileged AI productivity-tool or other first software process 491 and the third unprivileged AI productivity-tool process or other third software process 475 is conducted in user space 403. In order to obfuscate this communication between the first unprivileged AI productivity-tool or other first software process 491 to the third unprivileged AI productivity-tool process or other third software process 475, a secure communication may be created between these unprivileged software processes 491, 475. In an embodiment, the first unprivileged AI productivity-tool or other first software process 491 and second unprivileged AI productivity-tool process or other second software process 492, and the third unprivileged AI productivity-tool process or other third software process 475 may initiate a secure communication channels for transmission of encryption keys or other communications using, for example, a mutual transport layer security (MTLS) protocol or secure production identity framework for everyone (SPIFFE) protocol. This secure communication protocol may prevent third-parties from gaining access to the communication between the first unprivileged AI productivity-tool or other first software process 491, the second unprivileged AI productivity-tool process or other second software process 492 or the third unprivileged AI productivity-tool process or other third software process 475.

At process "D," upon request from the second unprivileged AI productivity-tool or other second software process 492, the intent identification software application may retrieve the audio/video data of the user query input to the intent identification software application 470 in its encrypted state. In an embodiment, the intent identification software application 470 acting as the second unprivileged AI productivity-tool or other process 492 may use the first encryption key 405-1 to decrypt the audio and video data to use the audio and video data as input for any of a number of ML model algorithms as described herein to conduct further processing of the audio/video user query intent to further operations of the AI productivity tool software module to determine a responsive capability intent action to the user query input. In the context where the first unprivileged AI productivity-tool or other first software process 491 is an AI productivity tool software module detecting instances of user query inputs being received, the second unprivileged AI productivity-tool process or other second software process 492 may include an embedding algorithm to determine user query intent values. The third unprivileged AI productivity-tool process or other third software process 475 may be, for example, a semantic or lexical matching algorithm to determine a similarity match between a user query intent value and a capability intent value for one or more AI productivity tool-enablable software applications, or other steps of determining responsive capabilities to the received user query input. Alternatively, the third unprivileged AI productivity-tool process or other third software process 475 or a later authorized software process may be an AI productivity tool-enablable software application that has been identified as including a capability intent action that can be performed and is responsive to the user-query input (e.g., the audio and video data).

For example, the user may provide user-query input (e.g., audio/video data) via the microphone 460 and/or camera 462 requesting to "Make my computer faster." This audio/video data flows through processes A-1 through E in order for the AI productivity tool-enablable software application (e.g., the third unprivileged AI productivity-tool process or other third software process 475) to cause the information handling system to complete executed processes (e.g., reduce background application executions, increase available processing resources, delete or remove files, or the like) thereby making executed operations at the information handling system faster per the user-query input. It is this user-query input that is protected audio/video data in the systems and methods described herein so that a third-party cannot access the audio/video data without the first encryption key 405-1 or later-processed output of steps of operation of the AI productivity tool software module without the second encryption key 405-2 or a copy thereof. In an embodiment, the third unprivileged AI productivity-tool process or other third software process 475 may provide copies of the second encryption key 405-2 to other authorized AI productivity-tool processes as appropriate such that those processes may also gain access to the output of the intent identification software application 470 stored on the second encrypted buffer 495-2. Further, similar additional steps to those shown in FIG. 4 may be added to encrypt output of authorized software processed in yet a third encrypted buffer (not shown) in other embodiments. This, thereby, prevents third-parties from using the audio/video data of user query inputs and later processed versions of the user query input audio/video data in a nefarious way such as in deep fakes or for control to access the AI productivity tool software application control of the information handling system.

The process in FIG. 4, in an embodiment, maintains the security of the user-query input (e.g., the audio and video data) throughout the process such that a third-party cannot access the audio/video data at all steps of processing by the AI productivity tool software module without both the first encryption key 405-1 and the second encryption key 405-2. This, thereby, prevents these third-parties from accessing or using the audio/video data in a nefarious way such as in deep fakes or other potentially harmful purposes to control operation of the AI productivity tool software module and the information handling system as well as protecting the users personal data included in the user query input audio or video data. Still further, any output from the execution of the intent identification software application 470 is also secured using the second encryption key 405-2 and the second encrypted buffer 495-2 such that a third-party may not also gain access to this data or use it for control of the user's information handling system or accessing other data via the AI productivity tool software module.

FIG. 5 is a flow diagram showing a method of securing audio-video user query input via execution of computer-readable program code instructions of an audio-video encryption filter driver and access to at least one encrypted buffer in kernel system memory according to an embodiment of the present disclosure. The method 500 described in connection with FIG. 5 may be operated on an information handling system such as an information handling system (e.g., 100, 200) described in connection with FIG. 1 or 2. In an embodiment, the systems and methods described herein may operate on the information handling system such that the method is executed "on-the-box" such that a wired or wireless network connection to a network is not necessary for operation of the method. In another embodiment, some modules, databases, and/or processing resources may be maintained on a remote server such that a wired or wireless network connection can be made with these remote servers and the method may be implemented as described herein.

The method 500 may include, at block 502, the hardware processor or other hardware processing device of the information handling system executing computer-readable program code instructions of an AI productivity tool software module including access to one or more AI productivity tool-enablable software applications executing on the information handling system. As described in some embodiments herein, the AI productivity tool may execute a series of unprivileged AI productivity-tool or other software processes that receive user-query input and provides output that responds to the user-query input and/or changes operations within the information handling system based on the received user-query input.

In an embodiment, the AI productivity tool software module acting as the first unprivileged AI productivity-tool or other first software process may be any application that can receive audio and/or video input from a microphone and/or camera of the information handling system that serves as the user-query input from the user of the information handling system. In an embodiment, the AI productivity tool module may include a virtual assistant-type AI software agent. In various embodiments, the hardware processor or other alternative hardware processing resources of the information handling system may execute computer-readable program code instructions of the AI productivity tool software module acting as the first unprivileged AI productivity-tool software process with an AI productivity tool software plug-in and monitor for user-query inputs in the form of audio and/or video at a microphone or camera for the intent identification software application of an AI productivity tool subagent to engage in processing to identify capability intent actions responsive to the user-query inputs.

Therefore, at block 504, the method 500 also includes determining whether any user-query input in the form of audio and/or video input has been received at the AI productivity tool software module acting as the first unprivileged AI productivity-tool or other process. Again, is appreciated that other data may be received from other peripheral devices and may be used as user-query input as described herein. For example, the keyboard (not shown) may be used to receive text input from the user and pass that text to the A/V encrypted filter driver or other filter driver executing via a hardware processor such that this text data cannot be accessible to any unauthorized process being executed on the information handling system or externally. As described herein, this text data may also be encrypted and made accessible to only those unprivileged software process that have an encryption key to access. Additionally, any unprivileged software process that is provided with this encryption key may access this text data and identify a capability associated with one or more AI productivity tool-enablable software applications to perform a capability intent action. It is also appreciated that other types of user-query input may also be provided such as images and computer files. Again, this data may be provided at the AI productivity tool software module and the first unprivileged software process may direct that this data be encrypted and made accessible to only those unprivileged software process that have an encryption key to access. Thus, although the present specification describes the incoming user-query input as audio and/or video data, the present specification also contemplates that text and image input may be used as user-query input as well.

Where, at block 504, no user-query input is received, the method 500 returns to block 502 with the AI productivity tool software module acting as the first unprivileged AI productivity-tool or other first software process continuing to monitor for this input. Where, at block 504, the AI productivity tool software module acting as the first unprivileged AI productivity-tool or other first software process does detect and receive user-query input in the form of audio and/or video input from a microphone and/or camera, the method 500 continues to block 506.

At block 506, the method 500 continues with the first unprivileged AI productivity-tool or other first software process (e.g., the AI productivity tool software module) directing that the audio and/or video data from a microphone and/or camera may be secured via encryption and saved in an encrypted data buffer for use by the first unprivileged AI productivity-tool or other authorized unprivileged software processes as part of the operations of the AI productivity tool software module. This identifies the audio and video as data to be protected via the processes described herein preventing third-parties and any unprivileged software process that do not have an encryption key and, thereby, lack authority to access this data.

At block 508, the method 300 includes, with the first unprivileged AI productivity-tool or other process, sending a request to an audio/video encryption filter driver to have the audio/video data from a microphone and/or camera transferred from an A/V input stack to be saved in a dedicated portion of the kernel system memory. As described herein, the kernel system memory may include portions of memory that secure the audio/video data from access to any unprivileged AI productivity-tool or other software process that is not authorized for access by the AI productivity tool software module during the course of its operations and does not provide an encryption key.

In an embodiment, the method 500 includes, at block 508, the first unprivileged AI productivity-tool or other first software process generating, with an encryption key generator, and transmitting a first encryption key to the audio/video encryption filter driver. It is appreciated that in some embodiments such as those described in connection with FIG. 3, the first unprivileged AI productivity-tool or other first software process may send the first encryption key to the A/V encryption filter driver and, later, provide the first encryption key or a copy of the first encryption key to a second unprivileged AI productivity-tool or other software process. In this embodiment, the second unprivileged AI productivity-tool or other second software process may include the intent identification software application that is used to invoke one or more ML model algorithms loaded by a machine learning model loading module and executed on the hardware processor in order to conduct one or more AI productivity tool or other software processes for embedding and similarity matching a user query input to a responsive capability as described herein.

In another embodiment, the first unprivileged AI productivity-tool or other first software process may send the first encryption key to the A/V encryption filter driver as well as to the intent identification software application acting as a second unprivileged AI productivity-tool or other software process. This allows a third unprivileged AI productivity-tool process or other third software process to also provide a second encryption key to the intent identification software application acting as the second unprivileged AI productivity-tool or other second software process to secure any output from the operation of the intent identification software application in a second portion or second encrypted buffer as described in embodiments shown in FIG. 4 herein. Thus, at block 508, the first unprivileged AI productivity-tool or other first software process and may transmit the first encryption key to the intent identification software application or, alternatively, share a copy of the first encryption key to the intent identification software application acting as the second unprivileged AI productivity-tool or other second software process as well as provide a copy of the first encryption key to the A/V encryption filter driver. In an embodiment, an audio/video input stack may transmit the audio/video data to the audio/video encryption filter driver and the hardware processor executes computer readable code instructions of the A/V encryption filter driver to use the first encryption key to encrypt the raw audio/video data of a user query input prior to storing the user query input audio/video data into the first encrypted buffer of the kernel system memory. At block 510, the method 500 includes the processor of the information handling system executing computer readable code instructions of the A/V encryption filter driver to encrypt the user query input audio/video data received from the A/V input stack using the first encryption key and storing the encrypted audio/video data within the first encrypted buffer on the kernel memory. In an embodiment, the first unprivileged AI productivity software process (e.g., the AI productivity tool software module executing a AI productivity tool software plug-in or any other process) may further specify cleanup data that defines how and if the saved audio and/or video data on the first encrypted buffer (or the second encrypted buffer) is to be deleted. This cleanup data may be transmitted through the audio/video input stack and audio/video encryption filter driver for the first encrypted buffer to use. In an example embodiment, the first unprivileged AI productivity-tool process or other first software process may provide or point to a memory-erasure algorithm that defines if, when, and how any data in the first encrypted buffer is deleted including any audio and/or video data maintained on the first encrypted buffer (or a second encrypted buffer described herein) of the kernel system memory. In an embodiment, the hardware processor may conduct the deletion of the data in the encrypted buffer pursuant to the memory-erasure algorithm. This memory-erasure algorithm may define if and when the audio and/or video data is to be deleted after a first or subsequent access by a second unprivileged AI productivity-tool process or other second software process, may define whether the permission to delete the audio and/or video data is to be provided solely by the first unprivileged software process (e.g., an originating process) or can be accepted by another unprivileged software process, or may define if and what time limit is provided until the audio and/or video data is to be deleted from the first encrypted buffer (or second encrypted buffer) in some various example embodiments. It is appreciated that any type of condition or algorithm may be provide that dictates if, by what, and when the stored audio and/or video data is to be deleted from the first encrypted buffer (or second encrypted buffer) and the present specification contemplates these other conditions and algorithms.

In some embodiments At block 512, the method 500 includes the first unprivileged AI productivity-tool or other first software process to direct a third unprivileged AI productivity-tool process or other third software process that is authorized for execution of later steps by the AI productivity tool software module to provide a second encryption key to the intent identification software application (i.e., acting as the second unprivileged AI productivity-tool process or other second software process). In an embodiment, the third unprivileged AI productivity-tool process or other third software process may send this second encryption key when instructed by the first unprivileged AI productivity-tool process or other first software process and upon it providing the first encryption key to the intent identification software application acting as the second unprivileged AI productivity-tool or other process. Again, the first encryption key will have been provided to both the audio/video encryption filter driver and the intent identification software application acting as the second unprivileged AI productivity-tool or other process whereas the second encryption key is only provided to the second unprivileged AI productivity-tool process or other second software process. As described herein, this second encryption key may be used by the second unprivileged AI productivity-tool process or other second software process to encrypt its output of later-processed user input query audio/video data (e.g., embedded user query intent values) into the second encrypted buffer. Then, the third unprivileged AI productivity-tool process or other third software process is the only authorized unprivileged software process having the second encryption key to gain access to any output from the execution of the intent identification software application and any ML model algorithm invoked therein, as the second unprivileged AI productivity-tool or other second software process as described below.

At block 514, the method 500 includes requesting, with the first unprivileged AI productivity-tool process or other first software process, that the intent identification software application acting as the second unprivileged AI productivity-tool process or other second software process conduct the query intent to capability intent identification process based on the user-query input. As described herein, the audio and video data may be a user-query input from the user requesting the information handling system perform an action or provide information to the user. As described herein, the user-query input within the audio and/or video data may be transmitted to an intent identification software application being executed by the hardware processor of the information handling system via an AI productivity tool software plug-in. In an embodiment, the intent identification software application may be part of an AI productivity tool subagent that operates with the AI productivity tool software application to provide chatbot services as described herein. The second unprivileged AI productivity-tool process or other second software process may request that one or more ML model algorithms be invoked through an SDK module and an AI productivity proxy API.

As such, at block 516, the method 500 may include the intent identification software application requesting an ML model algorithm through an SDK module and an AI productivity proxy API. In an embodiment, an SDK module may include any computer-readable program code instructions that is executed by the hardware processor or other hardware processing resource to request that a ML model algorithm be invoked to support the one or more AI productivity tool processes or other software processes executed to identify, in an embodiment, a capability intent action that similarity-matches with and responds to received audio and/or video data describing a user-query input from a user. Then the AI productivity tool software module may invoke a corresponding AI productivity tool-enablable software application or driver to execute any such responsive capability intent actions. For example, the ML model algorithms may include a query input-to-intent ML model algorithm that receives the user-query input as text or converted audio to text, and with an embedding algorithm generates a vectorized query intent value for the user-query input.

This vectorized query intent value may be used by a later unprivileged AI productivity-tool process or other software process, such as a third unprivileged AI productivity-tool process or other third software process, for later correlation with a capability intent value via execution of an ML model algorithm for a semantic or lexical similarity matching algorithm (e.g., a cosine similarity matching algorithms of query intent and capability intent vector values). In the example embodiment, such an ML model algorithms may include a query intent-to-capability matching ML model algorithm. In an embodiment, the query intent-to-capability matching ML model algorithm receives the vectorized query intent value or vectorized multimodal query intent value as input and then matches the vectorized query intent value or vectorized multimodal query intent value to a vectorized capability intent value associated with the AI productivity tool-enablable software application via a similarity correlation algorithm to identify a capability that can serve as the capability intent action responsive to a user-query input.

At block 518, the method 500 also includes the ML model loading module loads the appropriate ML model algorithms for the currently executing unprivileged AI productivity-tool process or other software process of the AI productivity tool software module during identification and execution of a responsive capability intent action to a user query input. Additionally, at block 520, the capability intent action is identified from the user-query input per the execution of the ML model algorithms described herein. The output from the execution of these ML module algorithms results in a capability intent action being identified per the execution of the ML model algorithms.

Proceeding to block 522, the method 500 includes the intent identification software application acting as the second unprivileged AI productivity-tool or other second software process in an embodiments encrypts its own output from the ML model algorithms invoked using the second encryption key to store that encrypted output on the second encrypted buffer on another portion of the kernel memory. A later unprivileged AI productivity-tool process or other software process, such as a third unprivileged AI productivity-tool process or other third software process, having provided the second encryption key may then retrieve this encrypted output and decrypt the output, such as further-processed user query input data, for input into its own unprivileged AI productivity-tool process or other software process. In an embodiment, cleanup data, described in embodiments herein, may also be provided that describes how, by what entity, and how often the data on the second encrypted buffer is to be deleted. This may be directed by either the first unprivileged software process, second unprivileged software process, or other unprivileged software process that is authorized to execute with the AI productivity tool software module in various embodiments.

At block 524, the method 500 also includes the third unprivileged software process using the second encryption key to access the encrypted data on the second encrypted buffer, decrypt that data from output of the second unprivileged AI productivity-tool process or other second software process, and identify the capability intent action to be carried out by one or more AI productivity tool-enabled software applications. It is appreciated that that third or later unprivileged software process may be one of many AI productivity tool-enablable software applications that each was capable of providing a second encryption key or later encryption key to the intent identification software application or a previous unprivileged AI productivity-tool process in order to be authorized and able to gain access to this output from a previous unprivileged AI productivity-tool process stored on the second or other encrypted buffer.

With the capability intent being identified, the method 500 includes, at block 526, a hardware processor executing computer-readable program code instructions of the AI productivity tool-enablable software application acting as the third unprivileged AI productivity-tool process or other third software process to perform the corresponding capability intent action. This method 500, in an embodiment, maintains the security of the user-query input (e.g., the audio and video data) throughout the process such that a third-party or an unprivileged software process that does not have or has not acquired the first encryption key from the first unprivileged AI productivity-tool process or other first software process of an OTB AI productivity tool software process cannot access this raw user query input audio/video data. Further, method 500, in an embodiment, maintains the security of later processed versions of the user-query input data (e.g., the audio and video data) throughout the process such that unauthorized third-party or an unprivileged software process that does not have or has not acquired the second encryption key from the third (or later) unprivileged AI productivity-tool process or other third (or later) software process of the OTB AI productivity tool software module operations cannot access this data either.

Thus, an authorized second unprivileged AI productivity tool or other second software process may be securely provided the first encryption key to access the first encrypted buffer in kernel system memory for access this A/V data in some embodiments. Still further, output from the intent identification software application that may be the second unprivileged AI productivity tool or other second software process and the ML model algorithms it has invoked may also be protected from access by a third-party or an unprivileged software process that has not received a second encryption key from an authorized third or later unprivileged AI productivity tool or other third software process according to embodiments herein. In this way, the steps of operation of software processes of the AI productivity tool software module for accepting user query input audio/video data and processing the same to similarity-match and identify a capability for execution of a responsive capability intent action may encrypt and protect personal identifying information in the raw user query input audio/video data as well as later processed versions of that user query audio/video data in embodiments herein.

At block 530, the method 500 includes determining if the information handling system is still initiated. Where the information handling system is still initiated, the method 500 proceeds to block 502 as described herein. Where the information handling system is no longer initiated, the method 500 may end here.

The blocks of the flow diagrams of FIGS. 3 through 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
a hardware processor, a memory device including kernel system memory, and a power management unit to provide power to the hardware processor and memory device;
the hardware processor to execute computer-readable program code instructions of a first unprivileged artificial intelligence (AI) productivity-tool software process for operations of an AI productivity tool software module to detect receipt of audio/video user query input data at an audio/video (A/V) input stack buffer memory that was recorded from a peripheral device;
the hardware processor to execute computer-readable program code of an encryption key generator associated with the first unprivileged AI productivity-tool software process to generate a first encryption key and transmit the first encryption key to an audio/video (A/V) encryption driver and securely transmit the first encryption key to a second unprivileged AI productivity-tool software process for operations of the AI productivity tool software module to identify a capability intent action responsive to the received audio/video user query input data;
the hardware processor to execute computer-readable program code of the A/V encryption filter driver to retrieve the audio/video user query input data from the A/V input stack buffer memory and use the first encryption key encrypt the audio/video user query input data for storage in an allocated encrypted storage buffer portion of the kernel system memory; and
the hardware processor to execute the computer-readable program code of the A/V encryption filter driver to send a handle describing the allocated kernel system memory to the second unprivileged AI productivity-tool software process for the second unprivileged AI productivity-tool software process to access the audio/video user query input data from the allocated encrypted storage buffer portion of the kernel system memory with the first encryption key.

2. The information handling system of claim 1, wherein the allocated encrypted storage buffer portion of the kernel system memory stores the audio/video user-query input data and prevents access from unauthorized software processes not authorized by the operations of the AI productivity tool software module and not providing the first encryption key to the audio/video encryption filter driver.

3. The information handling system of claim 1 further comprising:
the hardware processor to execute computer-readable program code instructions of the first unprivileged AI productivity-tool software process to define cleanup information including a memory-erasure policy describing how the allocated encrypted storage buffer portion of the kernel system memory is to erase the recorded audio/video user query input data.

4. The information handling system of claim 1 further comprising:
the hardware processor to execute computer-readable program code of the first unprivileged AI productivity-tool software process to communicate with the second unprivileged AI productivity-tool software process to transmit the first encryption key via a mutual transport layer security protocol to grant authorized access to the audio/video user query input data for the second unprivileged AI productivity-tool software process of the operations of the AI productivity tool software module.

5. The information handling system of claim 1 further comprising:
the hardware processor to execute computer-readable program code instructions of an intent identification software application that is the second unprivileged AI productivity-tool software process to receive a copy of the first encryption key from the first unprivileged AI productivity-tool software process to gain authorized access to the recorded audio/video user query input data in the allocated encrypted storage buffer portion of the kernel system memory for processing to determine a user query intent value from the recorded audio/video user query input data for a similarity comparison to a capability intent value.

6. The information handling system of claim 1 further comprising:
the hardware processor to execute computer-readable program code of the first unprivileged AI productivity-tool software process to instruct a third unprivileged AI productivity-tool software process to provide a second encryption key to the second unprivileged AI productivity-tool software process to encrypt output of the second unprivileged AI productivity-tool software process for access only by the third unprivileged AI productivity-tool software process during the operations of the AI productivity tool software module to identify the capability intent action of the information handling system responsive to the received user query input audio/video data.

7. The information handling system of claim 6, wherein the encrypted output of the second unprivileged AI productivity-tool software process is stored on a second allocated encrypted storage buffer portion of the kernel system memory distinct from the allocated encrypted storage buffer portion of the kernel system memory used to store the received audio/video user query input data by the A/V encryption filter driver.

8. The information handling system of claim 6 further comprising:

the hardware processor to execute computer-readable program code instructions of the second unprivileged AI productivity-tool software process to transmit an output memory location handle to the third unprivileged AI productivity-tool for the third unprivileged AI productivity-tool software process to access the encrypted output of the second unprivileged AI productivity-tool software process using the second encryption key.

9. A method of securing audio-video user query input data on an information handling system executing an AI productivity tool software module for chatbot operations comprising:

executing, with a hardware processor, computer-readable program code of a first unprivileged AI productivity-tool software process of operations of an AI productivity tool software module to request audio/video user query input data be recorded from a microphone or a video camera;

receiving the audio/video user query input data at an audio/video (A/V) input stack buffer memory;

executing computer-readable program code of an encryption key generator with the hardware processor that is associated with the first unprivileged AI productivity-tool software process to generate a first encryption key and transmit the first encryption key to an A/V encryption driver and securely transmit the first encryption key to a second unprivileged AI productivity-tool software process for operations of the AI productivity tool software module to identify a capability intent action responsive to the received audio/video user query input data;

executing computer-readable program code of the A/V encryption filter driver to retrieve the audio/video user query input data from the A/V input stack buffer memory and use the first encryption key encrypt the audio/video user query input data for storage in an allocated encrypted storage buffer portion of the kernel system memory; and executing the computer-readable program code of the A/V encryption filter driver to send a handle describing the allocated kernel system memory to the second unprivileged AI productivity-tool software process for the second unprivileged AI productivity-tool software process to access the audio/video user query input data from the allocated encrypted storage buffer portion of the kernel system memory with the first encryption key.

10. The method of claim 9, wherein the allocated encrypted storage buffer portion of the kernel system memory stores the audio/video user-query input data and prevents access from unauthorized software processes not authorized by the operations of the AI productivity tool software module and not providing the first encryption key to the audio/video encryption filter driver.

11. The method of claim 9 further comprising:

execute computer-readable program code of the first unprivileged AI productivity-tool software process to communicate with the second unprivileged AI productivity-tool software process to transmit the first encryption key via a mutual transport layer security protocol to grant authorized access to the audio/video user query input data in the allocated encrypted storage buffer portion of the kernel system memory to the second unprivileged AI productivity-tool software process for the operations of the AI productivity tool software module.

12. The information handling system of claim 1 further comprising:

executing computer-readable program code instructions of an intent identification software application that is the second unprivileged AI productivity-tool software process to receive a copy of the first encryption key from the first unprivileged AI productivity-tool software process to gain authorized access to the recorded audio/video user query input data in the allocated encrypted storage buffer portion of the kernel system memory for processing to determine a user query intent value from the recorded audio/video user query input data for a similarity comparison to a capability intent value.

13. The information handling system of claim 1 further comprising:

executing computer-readable program code of the first unprivileged AI productivity-tool software process to instruct a third unprivileged AI productivity-tool software process to provide a second encryption key to the second unprivileged AI productivity-tool software process to encrypt output of the second unprivileged AI productivity-tool software process for access only by the third unprivileged AI productivity-tool software process during the operations of the AI productivity tool software module to identify the capability intent action of the information handling system responsive to the received user query input audio/video data.

14. An information handling system comprising:

a hardware processor, a memory device including kernel system memory, and a power management unit to provide power to the hardware processor and memory device;

the hardware processor to execute computer-readable program code instructions of a first unprivileged artificial intelligence (AI) productivity-tool software process for operations of an AI productivity tool software module to detect receipt of audio/video user query input data at an audio/video (A/V) input stack buffer memory that was recorded from a microphone or a video camera;

the hardware processor to execute computer-readable program code of an encryption key generator associated with the first unprivileged AI productivity-tool software process to generate a first encryption key and transmit the first encryption key to an audio/video (A/V) encryption driver and to a second unprivileged AI productivity-tool software process for operations of the AI productivity tool software module;

the hardware processor to execute computer-readable program code of the A/V encryption filter driver to retrieve the audio/video user query input data from the A/V input stack buffer memory and use the first encryption key encrypt the audio/video user query input data for storage in an allocated encrypted storage buffer portion of the kernel system memory; and the hardware processor to execute computer readable code instructions of the second unprivileged AI productivity-tool software process to retrieve and decrypt the audio/video user query input data using the first encryption key, process the audio/video user query input data in a second operation step of the AI productivity tool software module operations as second software process output, and encrypt the second software process output with a second encryption key received from a third unprivileged AI productivity-tool software process of the operations of the AI productivity tool software module operations to identify a capability intent action on the information handling system responsive to the received audio/video user query input data.

15. The information handling system of claim 14, wherein the allocated encrypted storage buffer portion of the kernel system memory stores the audio/video user-query input data and prevents access from unauthorized software processes not authorized by the operations of the AI productivity tool software module and not providing the first encryption key to the audio/video encryption filter driver.

16. The information handling system of claim 14, wherein the encrypted second software process output of the second unprivileged AI productivity-tool software process is stored on a second allocated encrypted storage buffer portion of the kernel system memory distinct from the allocated encrypted storage buffer portion of the kernel system memory used to store the received audio/video user query input data by the A/V encryption filter driver.

17. The information handling system of claim 14 further comprising:

the hardware processor to execute computer-readable program code of the first unprivileged AI productivity-tool software process to communicate with the second unprivileged AI productivity-tool software process to transmit the first encryption key via a mutual transport layer security protocol to grant authorized access to the audio/video user query input data for the second unprivileged AI productivity-tool software process of the operations of the AI productivity tool software module.

18. The information handling system of claim 14 further comprising:

the hardware processor to execute the computer-readable program code of the A/V encryption filter driver to send a handle describing the allocated kernel system memory to the second unprivileged AI productivity-tool software process for the second unprivileged AI productivity-tool software process to access to the audio/video user query input data from the allocated encrypted storage buffer portion of the kernel system memory.

19. The information handling system of claim 14 further comprising:

the hardware processor to execute computer-readable program code of the first unprivileged AI productivity-tool software process to instruct the third unprivileged AI productivity-tool software process to provide a second encryption key to the second unprivileged AI productivity-tool software process to encrypt the second software process output of the second unprivileged AI productivity-tool software process for access only by the third unprivileged AI productivity-tool software process during the operations of the AI productivity tool software module to identify the capability intent action responsive to the received audio/video user query input data.

20. The information handling system of claim 14 further comprising:

the hardware processor to execute computer-readable program code instructions of the second unprivileged AI productivity-tool software process to execute an embedding machine learning algorithm to generate a user query input intent value for the received audio/video user query input data as the second software process output.

* * * * *